(12) United States Patent
Kannan et al.

(10) Patent No.: US 10,700,802 B2
(45) Date of Patent: Jun. 30, 2020

(54) VARIABLE LENGTH REFERENCE SIGNALING FOR FAST ACQUISITION IN SHARED SPECTRUM

(71) Applicant: QUALCOMM Incorporated, San Diego, CA (US)

(72) Inventors: Arumugam Chendamarai Kannan, San Diego, CA (US); Chirag Sureshbhai Patel, San Diego, CA (US); Tao Luo, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/898,981

(22) Filed: Feb. 19, 2018

(65) Prior Publication Data

US 2018/0241494 A1    Aug. 23, 2018

Related U.S. Application Data

(60) Provisional application No. 62/461,748, filed on Feb. 21, 2017.

(51) Int. Cl.
*H04J 11/00* (2006.01)
*H04L 5/00* (2006.01)
(Continued)

(52) U.S. Cl.
CPC ........ *H04J 11/0073* (2013.01); *H04B 7/0695* (2013.01); *H04J 11/0076* (2013.01);
(Continued)

(58) Field of Classification Search
CPC .. H04L 5/001; H04L 27/2611; H04W 56/001; H04B 7/0617; H04B 7/0695;
(Continued)

(56) References Cited

U.S. PATENT DOCUMENTS

2018/0109304 A1* 4/2018 Wiberg ................ H04B 7/0617
2018/0115958 A1* 4/2018 Raghavan .............. H04B 7/026
(Continued)

FOREIGN PATENT DOCUMENTS

WO    WO-2018141981 A1 * 8/2018 ........... H04B 7/0695

OTHER PUBLICATIONS

R1-1701800 "UE reporting for beam management", 3GPP TSG RAN WG1 Meeting #88, ZTE, ZTE Microelectronics, Athens, Greece, Feb. 13-17, 2017.*
(Continued)

*Primary Examiner* — Aristocratis Fotakis

(74) *Attorney, Agent, or Firm* — Holland & Hart LLP

(57) ABSTRACT

Methods, systems, and devices for wireless communication are described. A base station may configure bursts of synchronization signal (SS) blocks for discovery reference signal (DRS) transmission. The base station may transmit an SS block set in an SS burst according to a beam sweep pattern, which may be repeated for a subsequent SS block set. The base station may configure a number of SS block sets in each SS burst and transmit each SS block in an SS block set using a different beam. Each SS burst may be transmitted according to a different beam sweep pattern and the base station may repeat transmission of SS bursts according to a DRS repetition periodicity. A user equipment (UE) may sweep through antenna sub-arrays during reception of an SS burst to determine a suitable sub-array for communication.

17 Claims, 16 Drawing Sheets

(51) Int. Cl.
*H04W 48/16* (2009.01)
*H04B 7/06* (2006.01)
*H04W 16/14* (2009.01)
*H04L 5/14* (2006.01)

(52) U.S. Cl.
CPC ....... *H04L 5/0048* (2013.01); *H04J 2211/005* (2013.01); *H04L 5/001* (2013.01); *H04L 5/0098* (2013.01); *H04L 5/14* (2013.01); *H04W 16/14* (2013.01); *H04W 48/16* (2013.01)

(58) Field of Classification Search
CPC ............... H04J 11/0069; H04J 11/0079; H04J 11/0073; H04J 11/0076
See application file for complete search history.

(56) References Cited

U.S. PATENT DOCUMENTS

| 2018/0198575 A1* | 7/2018 | Sheng ................... H04J 11/0069 |
| 2018/0205440 A1* | 7/2018 | Enescu ................ H04B 7/0695 |
| 2018/0219606 A1* | 8/2018 | Ng ....................... H04B 7/0617 |

OTHER PUBLICATIONS

R1-1701573 "Design of SS burst set and SS block index", ZTE, ZTE Microelectronics, 3GPP TSG RAN WG1 Meeting #88, Athens, Greece Feb. 13-17, 2017.*

R1-1702058 "SS Burst Set and SS Block Configuration",CATT, 3GPP TSG RAN WG1 Meeting #88, Athens, Greece, Feb. 13-17, 2017.*

* cited by examiner

VARIABLE LENGTH REFERENCE SIGNALING FOR FAST ACQUISITION IN SHARED SPECTRUM

CROSS REFERENCES

The present Application for Patent claims priority to U.S. Provisional Patent Application No. 62/461,748 by Chendamarai Kannan et al., entitled "Variable Length Reference Signaling For Fast Acquisition in Shared Spectrum," filed Feb. 21, 2017, assigned to the assignee hereof.

BACKGROUND

The following relates generally to wireless communication, and more specifically to variable length reference signaling for fast acquisition in shared spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

A base station and UE may exchange various messages during a cell acquisition procedure to establish a communication link. In some cases, a base station may utilize beamformed transmissions during a cell acquisition procedure to mitigate path losses (e.g., if the base station is communicating at higher frequencies). A UE that includes multiple antennas may receive transmissions from a base station using various antenna configurations to determine a transmission beam and antenna configuration suitable for future communications. The process of selecting the antenna configuration and transmission beam may involve multiple iterations of reference signal transmissions (e.g., discovery reference signals (DRSs)) from the base station. In some cases, however, these reference signal transmissions may be relatively infrequent. Thus, each DRS cycle that passes without the UE and base station having established a suitable transmission beam and antenna configuration increases the delay associated with cell acquisition, potentially resulting in an inefficient use of resources (e.g., time, power) and a reduced system throughput.

SUMMARY

A base station may configure variable length bursts of synchronization signal (SS) blocks for discovery reference signal (DRS) transmission. To determine a suitable beam for communication, the base station may transmit one or more SS block sets in an SS burst according to a beam sweep pattern. In some cases, the base station may repeat the beam sweep pattern during transmission of a subsequent SS block set. The base station may configure the number of SS block sets to be transmitted in each SS burst and the base station may transmit each SS block of an SS block set over a different transmission beam, the order of which may be determined according to a given beam sweep pattern. In some aspects, each SS burst may be transmitted according to a different beam sweep pattern and the base station may repeat transmission of a set of SS bursts according to a DRS repetition periodicity.

A user equipment (UE) may include multiple antennas and when receiving DRS transmissions from the base station, the UE may sweep through various antenna sub-arrays (also referred to as panels) during cell acquisition. For example, a UE may utilize a first antenna sub-array to receive a first set of SS blocks within and SS burst transmission from the base station and may utilize a second antenna sub-array to receive a second set of SS blocks within an SS burst. Based on the received first and second sets of SS blocks, the UE may determine a suitable antenna sub-array to use for communication with the base station.

A method of for wireless communication is described. The method may include determining a first DRS interval for a shared radio frequency spectrum band, determining a first set of SS blocks to be transmitted in a first variable length SS burst based on a first set of transmission beams, and transmitting, using one or more transmission beams of the first set of transmission beams, the first variable length SS burst during the first DRS interval for the shared radio frequency spectrum band.

An apparatus for wireless communication is described. The apparatus may include means for determining a first DRS interval for a shared radio frequency spectrum band, means for determining a first set of SS blocks to be transmitted in a first variable length SS burst based on a first set of transmission beams, and means for transmitting, using one or more transmission beams of the first set of transmission beams, the first variable length SS burst during the first DRS interval for the shared radio frequency spectrum band.

Another apparatus for wireless communication is described. The apparatus may include a processor, memory in electronic communication with the processor, and instructions stored in the memory. The instructions may be operable to cause the processor to determine a first DRS interval for a shared radio frequency spectrum band, determine a first set of SS blocks to be transmitted in a first variable length SS burst based on a first set of transmission beams, and transmit, using one or more transmission beams of the first set of transmission beams, the first variable length SS burst during the first DRS interval for the shared radio frequency spectrum band.

A non-transitory computer readable medium for wireless communication is described. The non-transitory computer-readable medium may include instructions operable to cause a processor to determine a first DRS interval for a shared radio frequency spectrum band, determine a first set of SS blocks to be transmitted in a first variable length SS burst based on a first set of transmission beams, and transmit, using one or more transmission beams of the first set of transmission beams, the first variable length SS burst during the first DRS interval for the shared radio frequency spectrum band.

Some examples of the method, apparatus, and non-transitory computer-readable medium described above may further include processes, features, means, or instructions for determining a second DRS interval for the shared radio frequency spectrum band, where the second DRS interval may be after the first DRS interval. Some examples of the method, apparatus, and non-transitory computer-readable medium described above may further include processes, features, means, or instructions for determining a second set of SS blocks to be transmitted in a second variable length SS burst based on a second set of transmission beams. Some examples of the method, apparatus, and non-transitory computer-readable medium described above may further include processes, features, means, or instructions for transmitting, using one or more transmission beams of the second set of transmissions beams, the second variable length SS burst during the second DRS interval for the shared radio frequency spectrum band.

Some examples of the method, apparatus, and non-transitory computer-readable medium described above may further include processes, features, means, or instructions for transmitting a third variable length SS burst in a third DRS interval based on a DRS repetition periodicity.

In some examples of the method, apparatus, and non-transitory computer-readable medium described above, the third variable length SS burst may be a repetition of the first variable length SS burst.

In some examples of the method, apparatus, and non-transitory computer-readable medium described above, transmitting the first variable length SS burst includes: transmitting the first set of SS blocks according to a beam sweep pattern.

Some examples of the method, apparatus, and non-transitory computer-readable medium described above may further include processes, features, means, or instructions for repeating the beam sweep pattern multiple times in the first variable length SS burst.

In some examples of the method, apparatus, and non-transitory computer-readable medium described above, the first set of SS blocks includes multiple SS block sets and each of the multiple SS block sets spans a nominal SS period.

In some examples of the method, apparatus, and non-transitory computer-readable medium described above, transmitting the first variable length SS burst includes: transmitting using each of the first set of transmission beams.

Some examples of the method, apparatus, and non-transitory computer-readable medium described above may further include processes, features, means, or instructions for transmitting, using one or more transmission beams of the first set of transmission beams, an opportunistic DRS during the first DRS interval.

Some examples of the method, apparatus, and non-transitory computer-readable medium described above may further include processes, features, means, or instructions for selecting multiple beams from the first set of transmission beams based on a DRS initiation request message received from UE. Some examples of the method, apparatus, and non-transitory computer-readable medium described above may further include processes, features, means, or instructions for performing a beam refinement procedure with the UE based on the multiple beams.

In some examples of the method, apparatus, and non-transitory computer-readable medium described above, performing the beam refinement procedure includes: transmitting a signature on each of the multiple beams.

Some examples of the method, apparatus, and non-transitory computer-readable medium described above may further include processes, features, means, or instructions for SS blocks of the first set of SS blocks and the second set of SS blocks each include a physical broadcast channel (PBCH) message, a primary synchronization signal (PSS), a secondary synchronization signal (SSS), or any combination thereof.

A method of for wireless communication is described. The method may include determining a DRS interval for a shared radio frequency spectrum band, receiving, using a first antenna sub-array, a first set of SS blocks of an SS burst during the DRS interval, receiving, using a second antenna sub-array, a second set of SS blocks of the SS burst during the DRS interval, determining to use the first antenna sub-array or the second antenna sub-array for communication with a base station based on the received first set of SS blocks and the received second set of SS blocks, and communicating with the base station based on the determining.

An apparatus for wireless communication is described. The apparatus may include means for determining a DRS interval for a shared radio frequency spectrum band, means for receiving, using a first antenna sub-array, a first set of SS blocks of an SS burst during the DRS interval, means for receiving, using a second antenna sub-array, a second set of SS blocks of the SS burst during the DRS interval, means for determining to use the first antenna sub-array or the second antenna sub-array for communication with a base station based on the received first set of SS blocks and the received second set of SS blocks, and means for communicating with the base station based on the determining.

Another apparatus for wireless communication is described. The apparatus may include a processor, memory in electronic communication with the processor, and instructions stored in the memory. The instructions may be operable to cause the processor to determine a DRS interval for a shared radio frequency spectrum band, receive, using a first antenna sub-array, a first set of SS blocks of an SS burst during the DRS interval, receive, using a second antenna sub-array, a second set of SS blocks of the SS burst during the DRS interval, determine to use the first antenna sub-array or the second antenna sub-array for communication with a base station based on the received first set of SS blocks and the received second set of SS blocks, and communicate with the base station based on the determining.

A non-transitory computer readable medium for wireless communication is described. The non-transitory computer-readable medium may include instructions operable to cause a processor to determine a DRS interval for a shared radio frequency spectrum band, receive, using a first antenna sub-array, a first set of SS blocks of an SS burst during the DRS interval, receive, using a second antenna sub-array, a second set of SS blocks of the SS burst during the DRS interval, determine to use the first antenna sub-array or the second antenna sub-array for communication with a base station based on the received first set of SS blocks and the received second set of SS blocks, and communicate with the base station based on the determining.

In some examples of the method, apparatus, and non-transitory computer-readable medium described above, the first set of SS blocks may be received over a first time interval of a fixed length and the second set of SS blocks may be received of a second time interval of the fixed length.

In some examples of the method, apparatus, and non-transitory computer-readable medium described above, the first set of SS blocks includes a repetition of at least one SS block.

Some examples of the method, apparatus, and non-transitory computer-readable medium described above may further include processes, features, means, or instructions for performing a beam refinement procedure with the base station based on one or both of the received first set of SS blocks and the received second set of SS blocks.

In some examples of the method, apparatus, and non-transitory computer-readable medium described above, the first set of SS blocks and the second set of SS blocks include at least one common SS block.

In some examples of the method, apparatus, and non-transitory computer-readable medium described above, an interval between the SS burst and a second SS burst may be based on DRS overcrowding, acquisition latency, beam tracking requirements, or any combination thereof.

DETAILED DESCRIPTION

Figure 1:
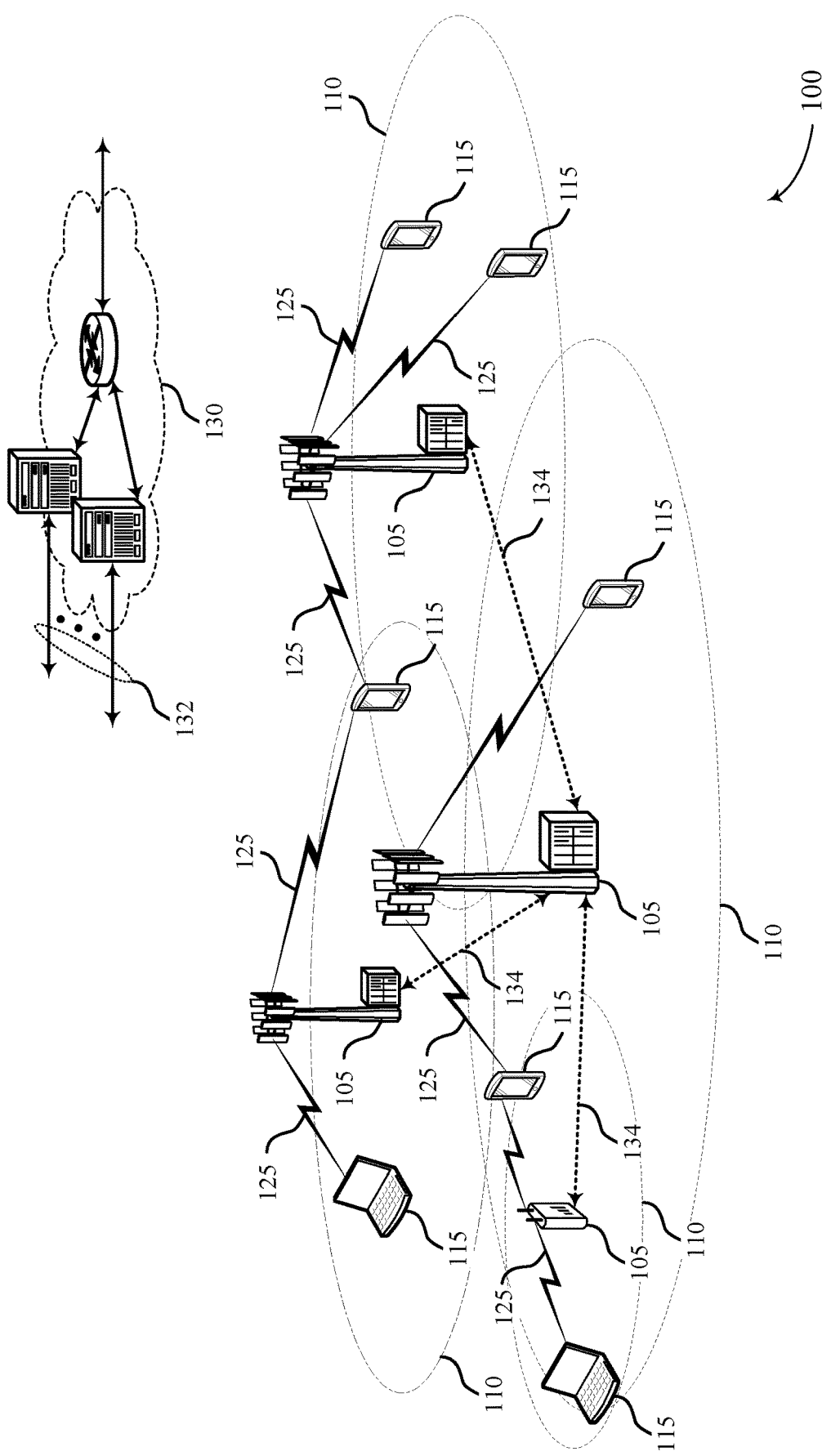
FIG. 1 illustrates an example of a wireless communications system that supports variable length reference signaling for fast acquisition in shared spectrum in accordance with aspects of the present disclosure.

A base station may transmit a signal to a user equipment (UE) using multiple transmission beams. The UE may receive the beams using different sets of antenna sub-arrays, also referred to as panels. Of each of the beams and panels, the UE may determine a beam and a panel for wireless communication (e.g., based on signal strength, received power, or beam direction, among other factors). During cell acquisition, the base station may transmit discovery reference signals (DRSs) in synchronization signal (SS) blocks of an SS burst to test the beams. The UE may cycle through panels while receiving the SS bursts to determine which panel to utilize for communication with the base station. However, if DRS cycles are sparse, cell acquisition may be delayed (e.g., if cell acquisition spans a larger number of DRS cycles). The present disclosure describes techniques for faster acquisition by using a variable length SS burst, known beam sweep pattern, and fast UE sub-array sweeps.

The base station may configure variable length bursts of SS blocks for DRS transmission. In some cases, the base station may determine a nominal SS periodicity for SS blocks of a DRS transmission. The base station may transmit a set of SS blocks according to a beam sweep during the nominal SS period, after which the base station may repeat the beam sweep for the next set of SS blocks and next nominal SS period. The base station may transmit a configurable number of the SS block sets in each SS burst transmission. Each SS burst may use a different beam pattern, and the base station may transmit the SS bursts according to a DRS repetition periodicity, which may be known by the UE. The base station may transmit an SS burst during an inter-DRS interval of configurable duration, and a DRS repetition period may span a configurable number of inter-DRS intervals. In other examples, the base station may use narrower beams and sweep through more beams in one burst, which may lead to deeper coverage and generally faster beam sweeps. In some examples, the SS bursts may be contention exempt transmissions.

A UE may switch panels while receiving an SS burst to determine a panel to utilize for communication with the base station. In some wireless systems, the UE may switch panels once per SS burst. However, if the panel to be selected for communication is the last panel used, the acquisition time may take at least as many inter-DRS intervals as the UE has panels, which may lead to a relatively long or delayed acquisition time. As described herein, the UE may rotate through panels based on the beam pattern used to transmit the SS blocks and SS bursts. In some examples, the panel rotation may take approximately as long as a set of SS blocks or, in other examples, the entire SS burst. In some cases, the UE may transmit a DRS initiation request message to the base station for beam refinement. Based on the DRS initiation request, the base station may perform a beam refinement procedure by transmitting a set of finer beams to the UE, and the UE may choose one of the finer beams for communication with the base station.

The techniques described above may be used to improve cell acquisition rates, for example determining a suitable beam and antenna sub-array (e.g., panel) for communication. Specifically, the base station may transmit a configurable number of SS blocks in a variable length SS burst to increase a likelihood of determining a suitable beam for communication with a UE during a DRS cycle. The UE may sweep through antenna sub-arrays during reception of the SS burst to improve rates of determining a suitable antenna sub-array for communication with the base station.

Aspects of the disclosure are initially described in the context of a wireless communications system. Aspects are then described with respect to transmission and panel rotation schemes. Aspects of the disclosure are further illustrated by and described with reference to apparatus diagrams, system diagrams, beamforming scheme diagrams, and flowcharts that relate to variable length reference signaling for fast acquisition in shared spectrum.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A), or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Synchronization (e.g., cell acquisition) may be performed using synchronization signals or channels transmitted by a synchronization source (e.g., a base station 105). A base station may transmit synchronization signal blocks containing discovery reference signals. Synchronization signals may include a primary synchronization signal (PSS) or a secondary synchronization signal (SSS). A UE 115 attempting to access a wireless network may perform an initial cell search by detecting a PSS from a base station 105. The PSS may enable synchronization of slot timing and may indicate a physical layer identity value. The PSS may be utilized to acquire timing and frequency portions of a cell identification (e.g., physical cell identifier (PCID)). The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix (CP) length. An SSS may be used to acquire the full PCID and other system information (e.g., subframe index). The physical broadcast channel (PBCH) may be used to acquire additional system information needed for acquisition (e.g., bandwidth, frame index). In some examples, a base station 105 may transmit an SSS but not a PSS, or a combined synchronization signal.

After receiving the PSS and SSS, the UE 115 may receive a master information block (MIB), which may be transmitted in a downlink physical channel for broadcast information (e.g., a PBCH). The MIB may contain system bandwidth information, a system frame number (SFN), and a physical hybrid automatic repeat request (HARQ) indicator channel (PHICH) configuration. After decoding the MIB, the UE 115 may receive one or more system information blocks (SIBs). Different SIBs may be defined according to the type of system information conveyed. SIB1 includes access information such as cell identity information, and may also indicate whether a UE 115 is allowed to camp on a cell. SIB1 also includes cell selection information (or cell selection parameters). Additionally, SIB1 includes scheduling information for other SIBs. SIB2 includes access information and parameters related to common and shared channels. SIB3 includes cell reselection parameters. SIB4 and SIB5 include reselection information about neighboring LTE cells. SIB6 through SIB8 include reselection information about non-LTE neighboring cells. SIB9 includes the name of a Home eNB. SIB10 through SIB12 include emergency notification information (e.g., tsunami and earthquake warnings) and SIB13 includes information related to multimedia broadcast multicast services (MBMS) configuration A UE 115 attempting to access a wireless network may perform an initial cell search by detecting a PSS from a base station 105. The PSS may enable synchronization of slot timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. After receiving the PSS and SSS, the UE 115 may receive a MIB, which may be transmitted in the PBCH. The MIB may contain system bandwidth information, an SFN, and a PHICH configuration. After decoding the MIB, the UE 115 may receive one or more SIBs. For example, SIB1 may contain cell access parameters and scheduling information for other SIBs. Decoding SIB1 may enable the UE 115 to receive SIB2. SIB2 may contain radio resource control (RRC) configuration information related to random access channel (RACH) procedures, paging, PUCCH, PUSCH, power control, SRS, and cell barring.

Wireless communications system 100 may operate in an ultra high frequency (UHF) frequency region using frequency bands from 700 MHz to 2600 MHz (2.6 GHz), although in some cases wireless local area network (WLAN) networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g. a base station 105) to shape and/or steer an overall antenna beam in the direction of a target receiver (e.g. a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g. a base station 105) and a receiver (e.g. a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. For example, different sets of one or more antennas in the array (i.e. different antenna subarrays) may be used to transmit beamformed signals in different directions. In some case, signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas, antenna arrays, or antenna sub-arrays to conduct beamforming operations for directional communications with a UE 115.

In some cases, wireless communications system 100 may be a packet-based network that operate according to a layered protocol stack. In the user plane, communications at the bearer or packet data convergence protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a UE 115 and a network device such as base station 105, or core network 130 supporting radio bearers for user plane data. At the Physical (PHY) layer, transport channels may be mapped to physical channels.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for CA. CA may be used with both FDD and TDD CCs.

In some cases, wireless communications system 100 may utilize enhanced CCs (eCCs). An eCC may be characterized by one or more features including: wider bandwidth, shorter symbol duration, shorter TTIs, and modified control channel configuration. In some cases, an eCC may be associated with a CA configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz) at reduced symbol durations (e.g., 16.67 microseconds). A TTI in eCC may consist of one or multiple symbols. In some cases, the TTI duration (that is, the number of symbols in a TTI) may be variable.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

The wireless communications system 100 may support variable length reference signaling for fast acquisition in shared spectrum such that a base station 105 may transmit DRS to a UE 115 in SS blocks of an SS burst, each SS burst associated with a beam sweep pattern according to a DRS repetition periodicity. The base station 105 may transmit sets of SS blocks of a nominal SS period in the SS burst, where each SS block in the set of SS blocks is transmitted according to a beam sweep pattern. The base station 105 may determine a suitable beam for communication with the UE 115 based on the beam sweep. The UE 115 may receive the SS blocks while sweeping sub-arrays of antennas to determine a suitable sub-array for communication with the base station 105.

Figure 2:
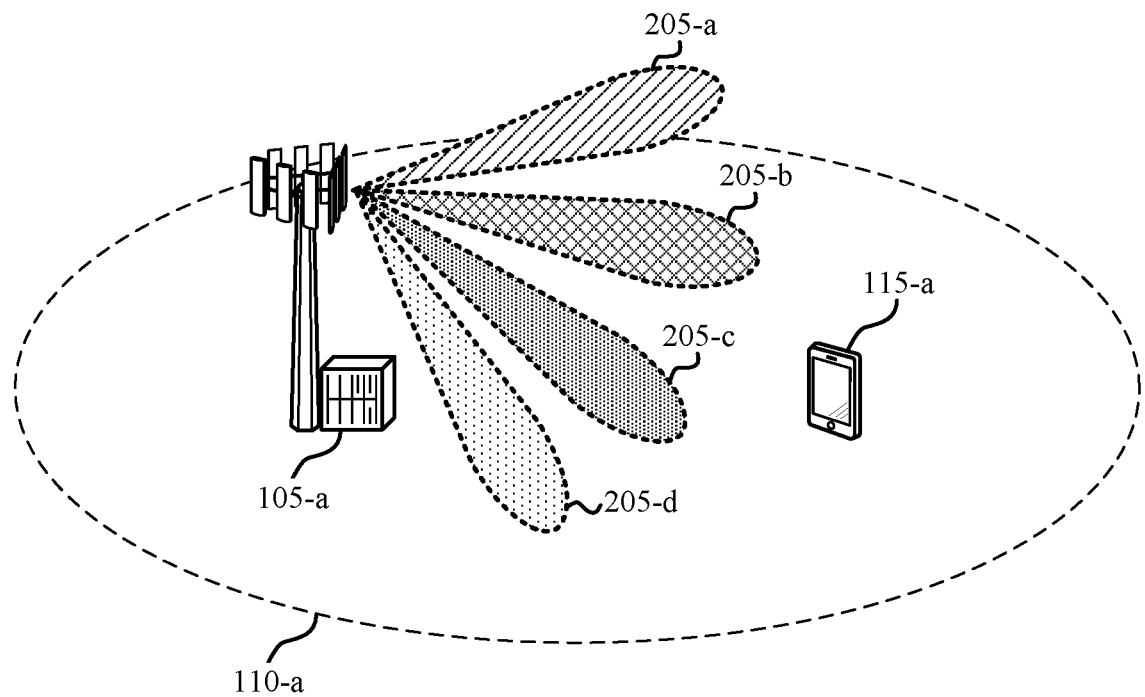
FIG. 2 illustrates an example of a wireless communications system that supports variable length reference signaling for fast acquisition in shared spectrum in accordance with aspects of the present disclosure.

FIG. 2 illustrates an example of a wireless communications system 200 that supports variable length reference signaling for fast acquisition in shared spectrum in accordance with various aspects of the present disclosure. Wireless communications system 200 may include a UE 115-*a* and base station 105-*a*, which may be examples of a UE 115 and base station 105 as described with reference to FIG. 1. Base station 105-*a* may transmit DRS using different beams 205 (e.g., beam 205-*a*, 205-*b*, 205-*c*, or 205-*d*, among others) to UE 115-*a* during cell acquisition, and UE 115-*a* may receive the transmissions using different antenna sub-arrays, or panels. During a cell acquisition procedure, UE 115-*a* and base station 105-*a* may determine a suitable beam and panel pair for future communication based on one or more DRS transmissions.

Base station 105-*a* may transmit to UE 115-*a* using multiple beams 205, and UE 115-*a* may receive the beams 205 using different antenna sub-arrays. Of each of the beams 205 and antenna sub-arrays, there may be a beam 205 and panel suitable for wireless communication. For instance, during a cell acquisition procedure, the UE 115-*a* may receive one or more beams 205 using different panels and may determine the beam and panel pairing that has the strongest signal (e.g., has the highest measured signal strength or highest signal to noise ratio).

During cell acquisition, base station 105-*a* may perform a DRS transmission by transmitting one or more SS blocks in an SS burst transmission. The SS bursts may include a number of SS blocks sets (e.g., 14 SS blocks, spanning 250 µs) and each SS block may be transmitted over a given beam 205. For example, an SS block may include one or more PBCH signals, PSSs, or SSSs, among others. UE 115-*a* may cycle through panels while receiving the SS bursts to determine a suitable panel to use for future communication with the base station 105-*a*. In some cases, the UE 115-*a* may use a first panel for reception during a first DRS interval that includes multiple SS bursts and a second panel during a second DRS interval that includes multiple SS bursts. However, if DRS cycles are sparse and the UE 115-*a* and base station 105-*a* are unable to determine an appropriate beam and panel pairing for communication, cell acquisition may be delayed (e.g., if the acquisition procedure involves a large number of DRS cycles). Thus, UE 115-*a* and base station 105-*a* may achieve faster acquisition by using a variable length SS burst, a known beam sweep pattern, and/or fast sub-array sweeps for UE 115-*a*.

In some examples, Base station 105-*a* may configure variable length bursts of SS blocks for DRS transmission. Base station 105-*a* may determine a nominal SS periodicity for SS blocks included within the DRS transmission and base station 105-*a* may transmit a set of SS blocks according to a beam sweep pattern over the nominal SS period. After the nominal SS period, the base station 105-*a* may repeat the beam sweep pattern for a next set of SS blocks during a subsequent nominal SS period. In some examples, the nominal SS period may span 250 µs, or 14 SS blocks. Base station 105-*a* may transmit a configurable number of the SS block sets in each SS burst transmission. For example, based on the configuration, an SS burst may include one set of SS blocks (e.g., the SS burst lasting one nominal SS period), or two sets (e.g., the SS burst lasting two nominal SS periods), or four sets (e.g., the SS burst lasting four nominal SS periods), and so on. An SS block may have a frequency bandwidth of, for example, 36 MHz.

Base station 105-*a* may transmit each SS block in an SS block set using a different beam 205. If an SS burst has multiple repetitions of the SS block set, repeating use of the beam 205 for multiple SS blocks in the SS burst may lead to a processing gain advantage and faster acquisition. For example, if an SS burst has 56 SS blocks, base station 105-*a* may transmit 4 sets of 14 SS blocks over 4 nominal SS periods, where each SS block, and therefore each beam 205, is repeated 4 times. In other examples, base station 105-*a* may use narrower beams (e.g., finer beams or beams having a smaller beam width) and sweep through more beams 205 in one burst. For example, in an SS burst of 56 SS blocks, base station 105-*a* may transmit using 56 different beams 205, using each beam 205 once in the SS burst. Using narrower beams may lead to deeper coverage and generally faster beam sweeps. The SS blocks may include DRS such as one or more PBCH messages, a PSS, and an SSS, among others and the DRS signal(s) may be multiplexed according to an FDM or TDM scheme. In some examples, the SS bursts may be contention exempt transmissions and may be transmitted over a designated time period referred to as a contention exempt transmission (CET) period. In some examples, the transmission of an SS burst that includes multiple SS blocks subsequently transmitted (e.g., one after another) may be referred to as a multi-beam DRS.

Each SS burst may be transmitted according to a different beam sweep pattern. In some cases, the SS bursts may be repeatedly transmitted according to a DRS repetition periodicity, which may be known to both the base station 105-*a* and the UE 115-*a*. Base station 105-*a* may transmit an SS burst during an inter-DRS interval of configurable duration, and a DRS repetition period may span a number of inter-DRS intervals. For example, a DRS repetition periodicity may include one, two, or four inter-DRS intervals, each inter-DRS interval including an SS burst corresponding to a different beam sweep pattern. In some cases, an inter-DRS interval may include an opportunistic (e.g., directional) DRS transmission which may be a listen-before-talk (LBT) compliant transmission of a DRS (e.g., one SS block) on a given transmission beam. The opportunistic DRS transmission may include multiple SS blocks and therefore may span a multiple of 250 µs. After the last inter-DRS interval of the DRS repetition period, base station 105-*a* may start a new DRS repetition period and transmit an SS burst during a first inter-DRS interval again, which may have a beam sweep pattern based on the first SS burst as transmitted within the previous DRS repetition period. In other words, transmission of SS bursts may be repeated based on the DRS repetition periodicity.

During reception of one or more SS bursts, UE 115-*a* may rotate through panels (i.e., antenna sub-arrays) to determine a suitable panel for communication with base station 105-*a*. In some wireless systems, UE 115-*a* may switch panels once per SS burst. In such cases, however, if the suitable panel ends up not being used quickly in the switching order (e.g., the suitable panel is the last panel used in the rotation of panels), cell acquisition time may be delayed as the total acquisition time may take multiple inter-DRS intervals (e.g., if the UE 115-*a* receives each DRS using a different panel).

In some examples, UE 115-*a* may rotate through panels during a single SS burst and the rotation of the panels may be based on the beam pattern used to transmit the SS blocks within the SS burst. For instance, UE 115-a may perform antenna sub-array sweeping (e.g., a complete rotation of panels of UE 115-a) at a rate where the UE 115-a may finish a sub-array sweep once every SS block. In some aspects, the sub-array sweeping may extend to include one or more additional SS blocks. For example, if UE 115-a begins a sub-array sweep at the start of DRS interval, UE 115-a may finish the set after the first SS block of a second, subsequent SS block set. In some cases, UE 115-a may know the beam sweep rotation of the SS blocks in an SS burst, which may assist UE 115-a in using the panels to receive at least a portion of an SS block from each beam 205. UE 115-a may not be aware of transmission timing of base station 105-a, but by sweeping through panels at a rate of the length of the SS block set, UE 115-a may determine a suitable panel when base station 105-a transmits the SS burst. By sweeping through panels during reception of a single SS burst, the overall time related to the cell acquisition procedure may be reduced. In some examples, UE 115-a may combine search metrics across different sub-array searches if a beam sweep repeats every nominal SS period (e.g., the SS burst includes repeated SS block sets). For example, UE 115-a may select or sort sub-arrays per relative strength of signal based on the repetition of beam sweep patterns within an SS burst every nominal SS period.

In some examples, UE 115-a may transmit a DRS initiation request message to base station 105-a for beam refinement. Base station 105-a may transmit DRS to UE 115-a using, for example, 4 sets of 14 beams 205 to UE 115-a. UE 115-a may select a set of beams 205 of the 14 beams 205 and transmit a beam refinement request to base station 105-a based on the selected set of beams 205. Base station 105-a may perform a beam refinement procedure, for example by transmitting a set of finer beams to UE 115-a. In some examples, a physical waveform of DRS on each of the finer beams may be similar to a multi-beam DRS as transmitted in an SS burst. In other examples, the physical waveform of DRS on each finer beam may include a signature different from the multi-beam DRS. In some examples, the signature may be indicated by or included within a channel state information reference signal (CSI-RS). Based on the beam refinement procedure, the UE 115-a may choose one of the finer beams for communication with base station 105-a.

Figure 3:
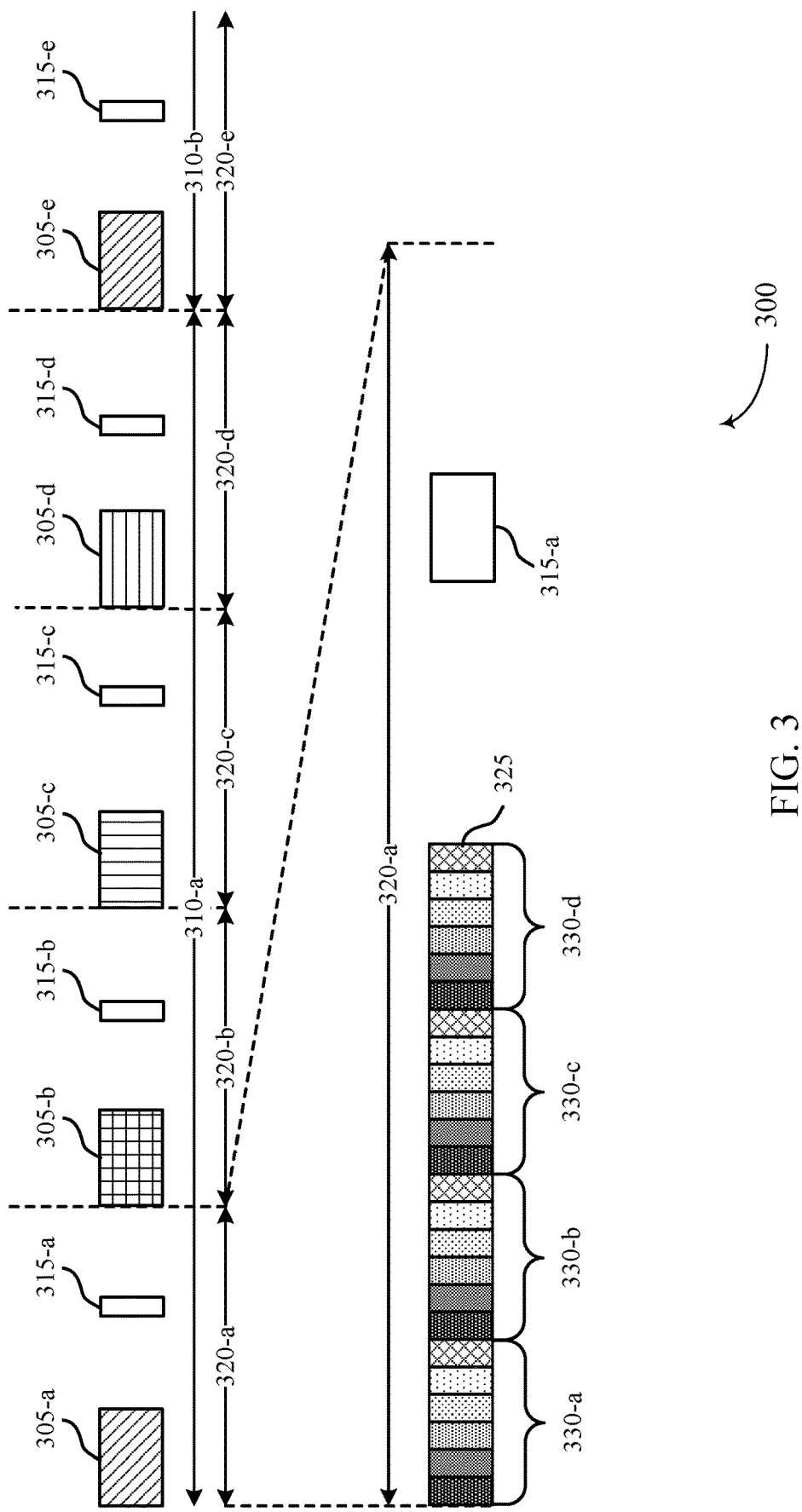
FIG. 3 illustrates an example of a discovery reference signal (DRS) transmission scheme that supports variable length reference signaling for fast acquisition in shared spectrum in accordance with aspects of the present disclosure.

FIG. 3 illustrates an example of a DRS transmission scheme 300 that supports variable length reference signaling for fast acquisition in shared spectrum in accordance with various aspects of the present disclosure. The DRS transmission scheme 300 may be utilized by a base station 105 to transmit DRS (e.g., to a UE 115). A DRS may include multiple SS block sets 330 transmitted in an SS burst 305. In some cases, the base station 105 may use multiple different beams to transmit the SS blocks in accordance with a configurable beam sweep pattern and timing based on the beam repetition being carried out at a certain periodicity.

The base station 105 may perform cell acquisition with a UE 115 by transmitting a number of SS bursts 305 in a DRS repetition period 310. Each SS burst 305 may be transmitted during in an inter-DRS interval 320. For example, SS burst 305-a may be transmitted during inter-DRS interval 320-a, SS burst 305-b may be transmitted during inter-DRS interval 320-b, SS burst 305-c may be transmitted during inter-DRS interval 320-c, and SS burst 305-d may be transmitted during inter-DRS burst 320-d. The duration of DRS repetition period 310-a is based on the total duration of the inter-DRS intervals 320-a through 320-d. In some examples, an SS burst 305 may be a CET. DRS repetition period 310-b may follow DRS repetition period 310-a, and may include an SS bursts 305-e that is common to or the same as SS burst 305-a of DRS repetition period 310-a. In some cases, each of the DRS repetition periods 310 may include multiple SS bursts 305, each of which may correspond to an SS burst 305 of a previous DRS repetition period 310.

SS burst 305-a may include a number of SS blocks 325 that may be grouped into multiple SS block sets 330. For example, SS burst 305-a may include 4 SS block sets 330 (e.g., SS block set 330-a, 330-b, 330-c, and 330-d), where each SS block set 330 may be of a nominal SS duration (e.g., 14 SS blocks or 250 μs). Each SS block, such as SS block 325, in an SS block set 330 may be transmitted using a different transmission beam. In some cases, the beam sweep pattern used for transmitted each SS block set 330 may be the same. Thus, the base station 105 may transmit using each beam four times within SS burst 305-a, which is based on the number of SS block sets 330 within SS burst 305-a. The additional SS blocks 325, and therefore additional DRS transmissions, may assist the UE 115 with faster cell acquisition and reduce the number of DRS cycle occurrences during cell acquisition. In other examples, an SS burst 305 may include a single SS block set 330 spanning the entire SS burst 305. Thus, in some examples, each SS block 325 in an SS burst 305 may be transmitted with a different beam.

The base station 105 may configure the duration of inter-DRS intervals 320. For example, the duration of an inter-DRS interval 320 may be chosen based on DRS overcrowding or pollution, acquisition latency, and/or beam tracking requirements. An inter-DRS interval 320 may have a duration of, for example, 10 ms, 20 ms, or 40 ms. In some cases, the base station 105 may transmit both an SS burst 305 and an opportunistic DRS 315 during an inter-DRS interval 320. For example, the base station 105 may transmit SS burst 305-a and opportunistic DRS 315-a during inter-DRS interval 320-a. Base station 105-a may transmit opportunistic DRS 315-a with a beam used to transmit one or more SS blocks 325 of SS burst 305-a. An opportunistic DRS 315 (e.g., such as directional DRSs 315-a, 315-b, 315-c, 315-d, and 315-e) may have a length of one or more nominal SS duration (e.g., a multiple of 250 μs) and be transmitted using a given beam.

Figure 4A:
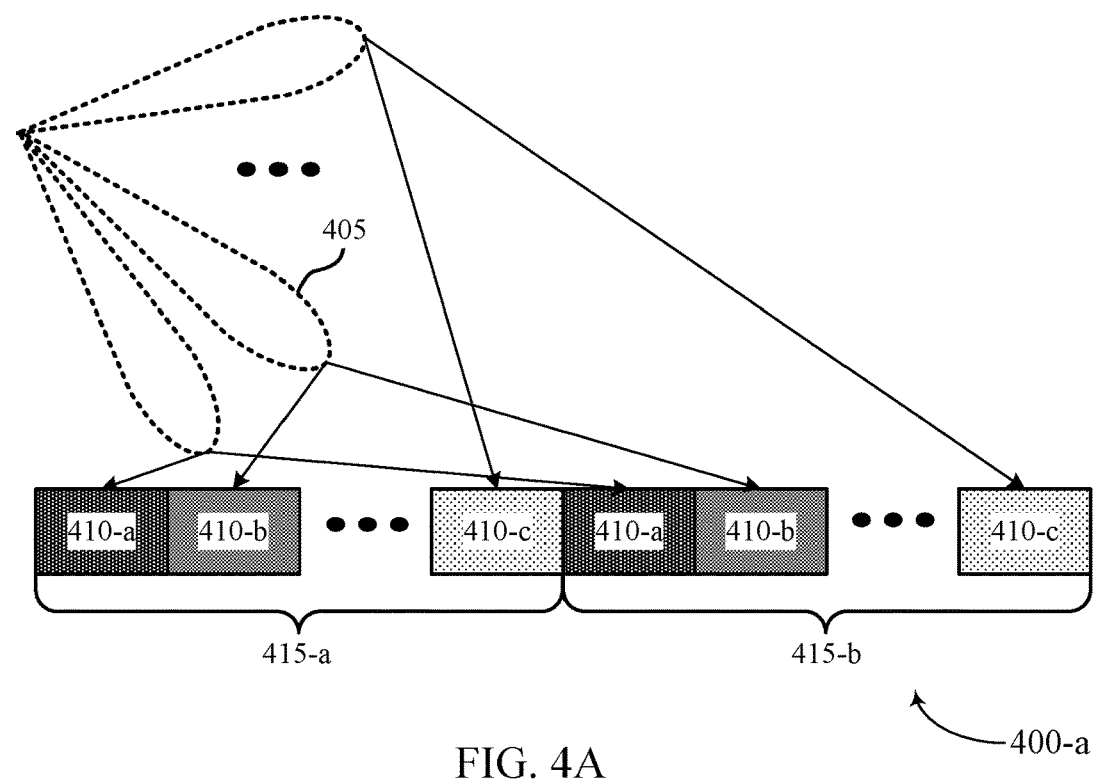
FIGS. 4A and 4B illustrate examples of transmission schemes that support variable length reference signaling for fast acquisition in shared spectrum in accordance with aspects of the present disclosure.
Figure 4B:
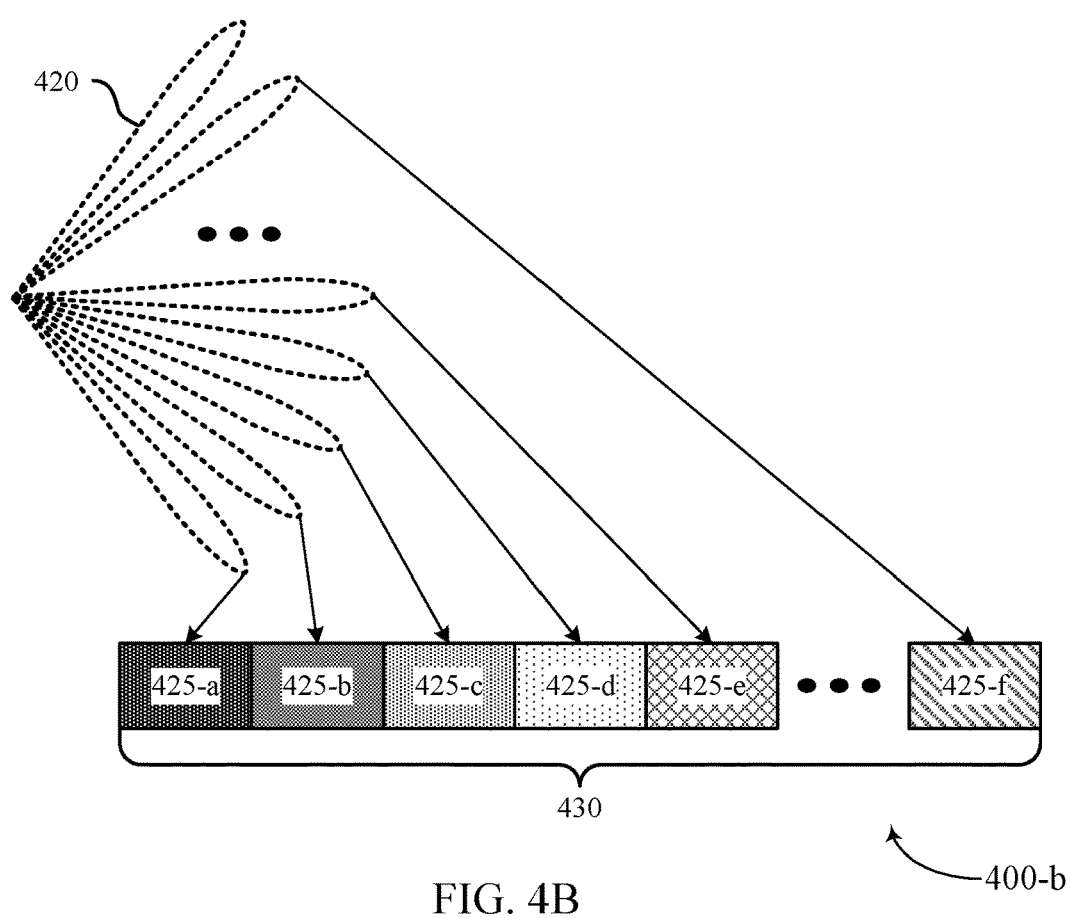

FIGS. 4A and 4B illustrate examples of SS block transmission schemes 400 that support variable length reference signaling for fast acquisition in shared spectrum in accordance with various aspects of the present disclosure. A base station 105 may transmit SS blocks in an SS burst to a UE 115 using a set of beams and in accordance with an SS block transmission scheme 400.

In FIG. 4A, SS block transmission scheme 400-a shows DRS transmission using multiple SS block sets 415. The base station 105 may transmit DRS to the UE 115 for cell acquisition using one or more beams 405. The base station 105 may transmit SS blocks 410 to the UE 115 in SS block sets 415 and in some cases, the base station 105 may transmit each SS block 410 in SS block set 415-a using a given beam 405. For example, the base station 105 may transmit SS block 410-a using a first beam 405, SS block 410-b using a second beam 405, and SS block 410-c using an Nth beam 405, where N is the number of SS blocks 410 in SS block set 415-a. In some examples, SS block set 415-a may have a nominal SS duration, which may include 14 SS blocks 410 for a duration of 250 μs, or any other number of SS blocks 410 that span a given duration.

The base station 105 may transmit SS block set 415-b following SS block set 415-a. SS block set 415-a may include common SS blocks 410 as those within SS block set 415-a. For example, during SS block set 415-b, the base station 105 may again transmit SS block 410-*a* using a first beam 405, SS block 410-*b* using a second beam 405, and SS block 410-*c* using an Nth beam 405, where N is the number of SS blocks 410 in SS block set 415-*b*. Thus, the base station 105 may transmit SS block 410-*a* as many times as there are SS block sets 415 in an SS burst 415. Repeating SS blocks 410 in an SS burst 415 may provide a processing gain advantage for faster acquisition.

In FIG. 4B, SS block transmission scheme 400-*b* shows DRS transmission using finer beams. The base station 105 may transmit SS blocks 425 using fine beams 420. The base station 105 may transmit one set of SS blocks 425 to the UE 115 in an SS burst 430, where each SS block 425 in the set is transmitted using a different beam. For example, SS block 425-*a* may be transmitted by a first fine beam 420, SS block 425-*b* by a second fine beam 420, SS block 425-*c* by a third fine beam 420, SS block 425-*d* by a fourth fine beam 420, SS block 425-*e* by a fifth fine beam 420, and SS block 425-*f* transmitted by an Nth fine beam 420, where N is a number of SS blocks in the SS burst 430. Thus, each SS block 425 in the SS burst 430 may be transmitted using a different fine beam 420. In some examples, the duration of the SS burst 430 may still include a number of nominal SS durations. For example, a base station 105 may transmit SS blocks 425 using 56 different beams over four nominal SS periods. Using fine beams 420 may provide deeper coverage and faster beam sweeps for the base station 105.

In some examples, if a UE 115 requests beam refinement, the base station 105 may transmit SS blocks 425 using fine beams 420 as described. In some examples, the physical waveform of the DRS transmission on each of the fine beams 420 for beam refinement may be similar to a multi-beam DRS (e.g., used for cell acquisition). In other examples, the physical waveform of DRS on each of the fine beams 420 may include a signature that is different from the multi-beam DRS. In some examples, the signature may be indicated by or included within a CSI-RS.

Figure 5:
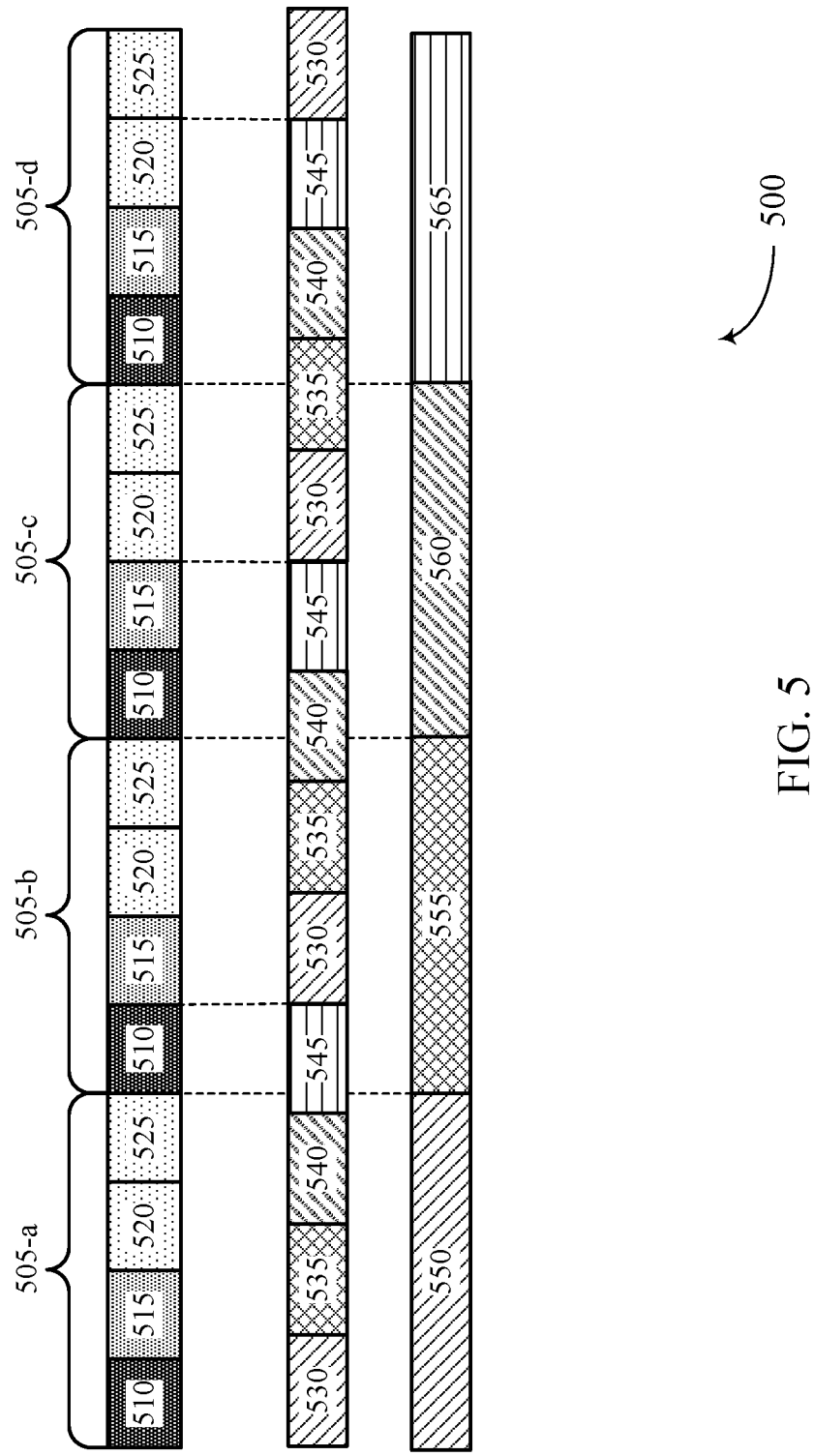
FIG. 5 illustrates an example of a panel rotation scheme that supports variable length reference signaling for fast acquisition in shared spectrum in accordance with aspects of the present disclosure.

FIG. 5 illustrates an example of a panel rotation scheme 500 that supports variable length reference signaling for fast acquisition in shared spectrum in accordance with various aspects of the present disclosure. A UE 115 may rotate through panels (e.g., antenna sub-arrays) used to receive SS blocks from a base station 105, for example. In some cases, the UE 115 may not be aware of transmission timing information of the base station 105, but by switching through panels at a rate corresponding to a known beam sweep pattern, the UE 115 may determine a suitable panel for communication during reception of an SS burst. The SS blocks may be transmitted by the base station 105 over a number of different beams.

A UE 115 receiving a DRS transmission that includes an SS burst having multiple SS blocks may rotate through panels during reception of a given SS burst in order to determine a suitable panel for communication with the base station 105. The base station 105 may use a beam sweep pattern (which may be known by the UE 115) to transmit multiple SS blocks in an SS block set 505. For example, in each SS block set 505, the base station 105 may transmit a first SS block 510, second SS block 515, third SS block 520, and fourth SS block 525 sequentially. The base station 105 may transmit a configurable number of SS blocks in an SS block set 505 (e.g., the base station 105 may transmit 14, 28, 56, or any other number of SS blocks in other configurations of SS block sets). The UE 115 may configure panel sweep timings based on the beam sweep pattern or in some cases, based on the length of the SS block set 505.

In some examples, the UE 115 may perform panel sweeping across multiple SS block sets 505 or multiple SS blocks. For instance, the UE 115 may use panel 530 to receive an SS block 510 and a portion of an SS block 515 during SS block set 505-*a*. The UE 115 may then use panel 535 to receive a portion of the SS block 515 and a portion of an SS block 520 and use panel 540 to receive a portion of the SS block 520 and a portion of an SS block 525. For panel 545, the UE 115 may receive a portion of the SS block 525 of SS block set 505-*a* then receive the entire SS block 510 of SS block set 505-*b*. After receiving using panel 545, the UE 115 has completed a full panel rotation, spanning SS block set 505-*a* and one SS block of SS block set 505-*b*. Thus, the UE 115 may begin additional panel sweeps (e.g., at the start of receiving SS block 515 of SS block set 505-*b*, SS block 520 of SS block set 505-*c*, or SS block 525 of SS block set 505-*d*).

In other examples, the UE 115 may listen to an SS block set 505 using a panel, then switch panels for a subsequent SS block set 505. For example, the UE 115 may listen to SS block set 505-*a* using a panel 550, receiving the SS blocks 510, 515, 520, and 525. For SS block set 505-*b*, the UE 115 may switch panels and listen to the set using panel 555. UE 115-*b* may listen to SS block set 505-*c* using panel 560 and SS block set 505-*d* using panel 565. In other examples, the UE 115 may listen to a full SS block set 505 and one more SS block of the subsequent SS block set 505. For example, using panel 550, the UE 115 may receive the SS block set 505-*a* and an SS block 510 of SS block set 505-*b*. The UE 115 may start a new panel sweep for an SS block 515 of SS block set 505-*b*, for an SS block 520 of SS block set 505-*c*, and for an SS block 525 of SS block set 505-*d*. In some examples, the UE 115 may change panels once every DRS cycle (e.g., 5 ms). For example, the UE 115 may change panels every DRS cycle for licensed DRS, or if the UE 115 is unaware of the DRS timing or beam sweep pattern.

Figure 6:
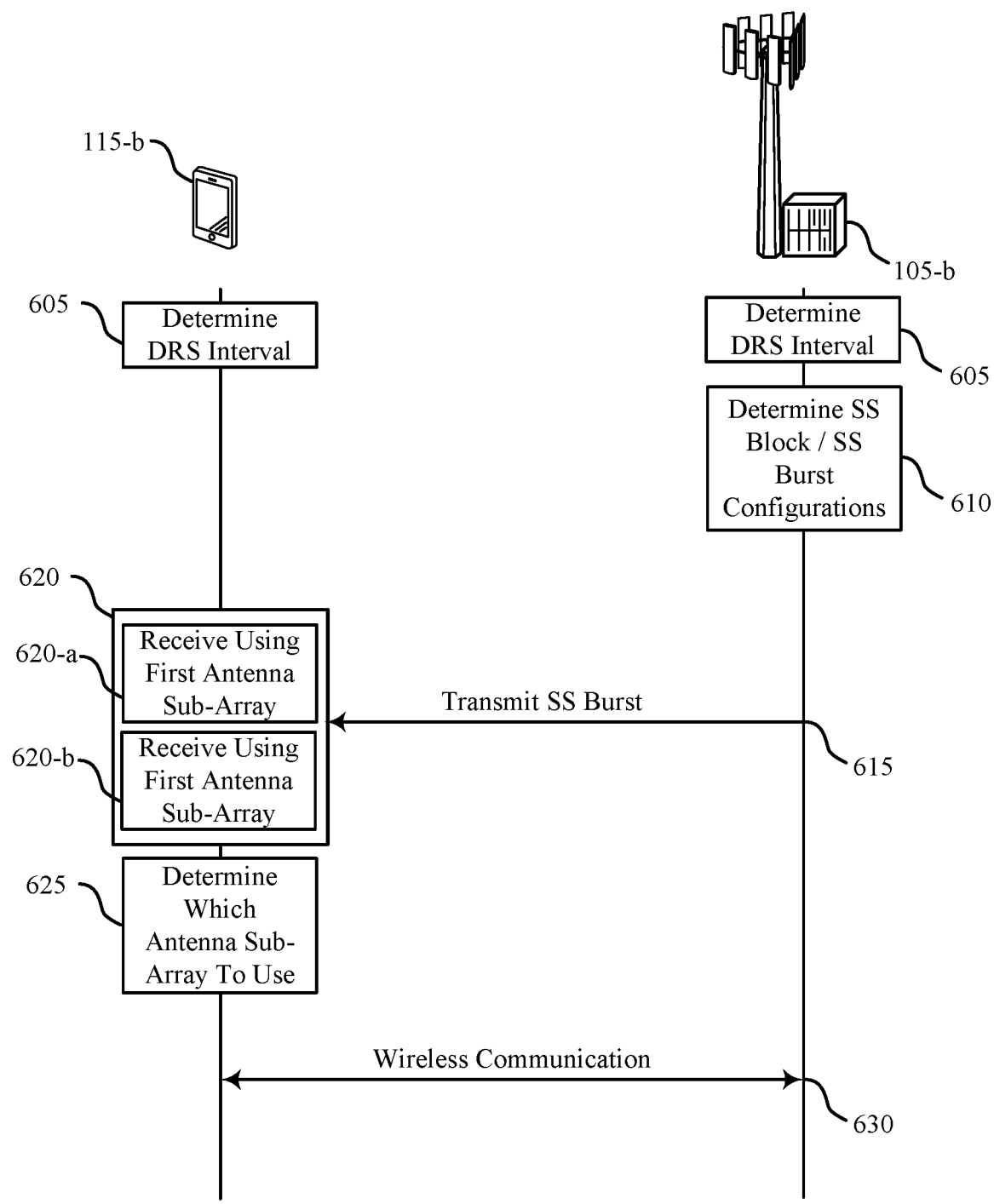
FIG. 6 illustrates an example of a process flow that supports variable length reference signaling for fast acquisition in shared spectrum in accordance with aspects of the present disclosure.

FIG. 6 illustrates an example of a process flow 600 that supports variable length reference signaling for fast acquisition in shared spectrum in accordance with various aspects of the present disclosure. Process flow 600 may include base station 105-*b* and UE 115-*b*, which may be respective examples of a base station 105 and UE 115 as described herein.

At 605, base station 105-*b* may determine an inter-DRS interval for transmitting an SS burst over a shared spectrum. Base station 105-*b* may determine a first DRS interval for a shared radio frequency spectrum band. Also at 605, UE 115-*b* may determine the DRS interval for the shared radio frequency spectrum band. In some cases, the DRS interval may be known to both the UE 115-*b* and the base station 105-*b*.

At 610, base station 105-*b* may determine an SS block configuration and/or an SS burst configuration. Base station 105-*b* may determine a first set of SS blocks to be transmitted in a first variable length SS burst based on a first set of transmission beams. In some examples, the SS blocks may each include a PBCH message, a PSS, an SSS, or any combination thereof. In some examples, the first set of SS blocks may include multiple SS block sets, and each of the multiple SS block sets may span a nominal SS period. In some examples, an interval between the SS burst and a second SS burst may be based on DRS overcrowding, acquisition latency, beam tracking requirements, or any combination thereof.

At 615, base station 105-*b* may transmit the SS burst to UE 115-*b* based on the configuration. Base station 105-*b* may transmit, using one or more transmission beams of the first set of transmission beams, the first variable length SS burst during the first DRS interval for the shared radio frequency spectrum band. In some examples, transmitting the first variable length SS burst may include transmitting the first set of SS blocks according to a beam sweep pattern and, in some examples, repeating the beam sweep pattern multiple times in the variable length SS burst. In some examples, transmitting the first variable length SS burst may include transmitting using each of the first set of transmission beams.

At 620, UE 115-*b* may receive the SS burst using one or more antenna sub-arrays. For example, at 620-*a*, UE 115-*b* may receive, using a first antenna sub-array, the first set of SS blocks of the SS burst during the DRS interval. At 620-*b*, UE 115-*b* may receive, using a second antenna sub-array, a second set of SS blocks of the SS burst during the DRS interval. In some examples, the first set of SS blocks may be received over a first time interval of a fixed length, and the second set of SS blocks may be received over a second time interval of the fixed length. In some examples, the first set of SS blocks and the second set of SS blocks may include at least one common SS block.

At 625, UE 115-*b* may determine which antenna sub-array to use. UE 115-*b* may determine to use the first antenna sub-array or the second antenna sub-array for communication with base station 105-*b* based on the received first set of SS blocks and the received second set of SS blocks. In some examples, base station 105-*b* may determine a beam for communicating with UE 115-*b*. At 630, UE 115-*b* and base station 105-*b* may communication over the shared radio frequency spectrum band based on the determined antenna sub-array and, in some examples, the determined beam.

Figure 7:
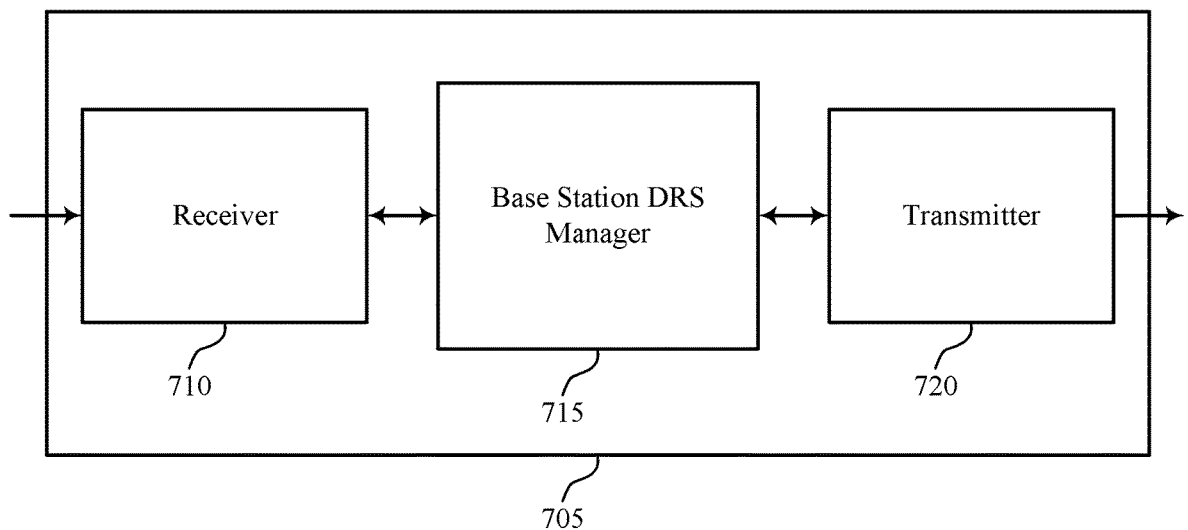
FIGS. 7 through 9 show block diagrams of a device that supports variable length reference signaling for fast acquisition in shared spectrum in accordance with aspects of the present disclosure.

FIG. 7 shows a block diagram 700 of a wireless device 705 that supports variable length reference signaling for fast acquisition in shared spectrum in accordance with various aspects of the present disclosure. Wireless device 705 may be an example of aspects of a base station 105 as described with reference to FIGS. 1 and 2. Wireless device 705 may include receiver 710, base station DRS manager 715, and transmitter 720. wireless device 705 may also include a processor. Each of these components may be in communication with one another (e.g., via one or more buses).

Receiver 710 may receive information such as packets, user data, or control information associated with various information channels (e.g., control channels, data channels, and information related to variable length reference signaling for fast acquisition in shared spectrum). Information may be passed on to other components of the device. The receiver 710 may be an example of aspects of the transceiver 1035 described with reference to FIG. 10.

Base station DRS manager 715 may be an example of aspects of the base station DRS manager 1015 described with reference to FIG. 10. Base station DRS manager 715 and/or at least some of its various sub-components may be implemented in hardware, software executed by a processor, firmware, or any combination thereof. If implemented in software executed by a processor, the functions of the base station DRS manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The base station DRS manager 715 and/or at least some of its various sub-components may be physically located at various positions, including being distributed such that portions of functions are implemented at different physical locations by one or more physical devices. In some examples, base station DRS manager 715 and/or at least some of its various sub-components may be a separate and distinct component in accordance with various aspects of the present disclosure. In other examples, base station DRS manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station DRS manager 715 may determine a first DRS interval for a shared radio frequency spectrum band and determine a first set of SS blocks to be transmitted in a first variable length SS burst based on a first set of transmission beams. Base station DRS manager 715 may transmit, using one or more transmission beams of the first set of transmission beams, the first variable length SS burst during the first DRS interval for the shared radio frequency spectrum band.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may include a single antenna, or it may include a set of antennas.

Figure 8:
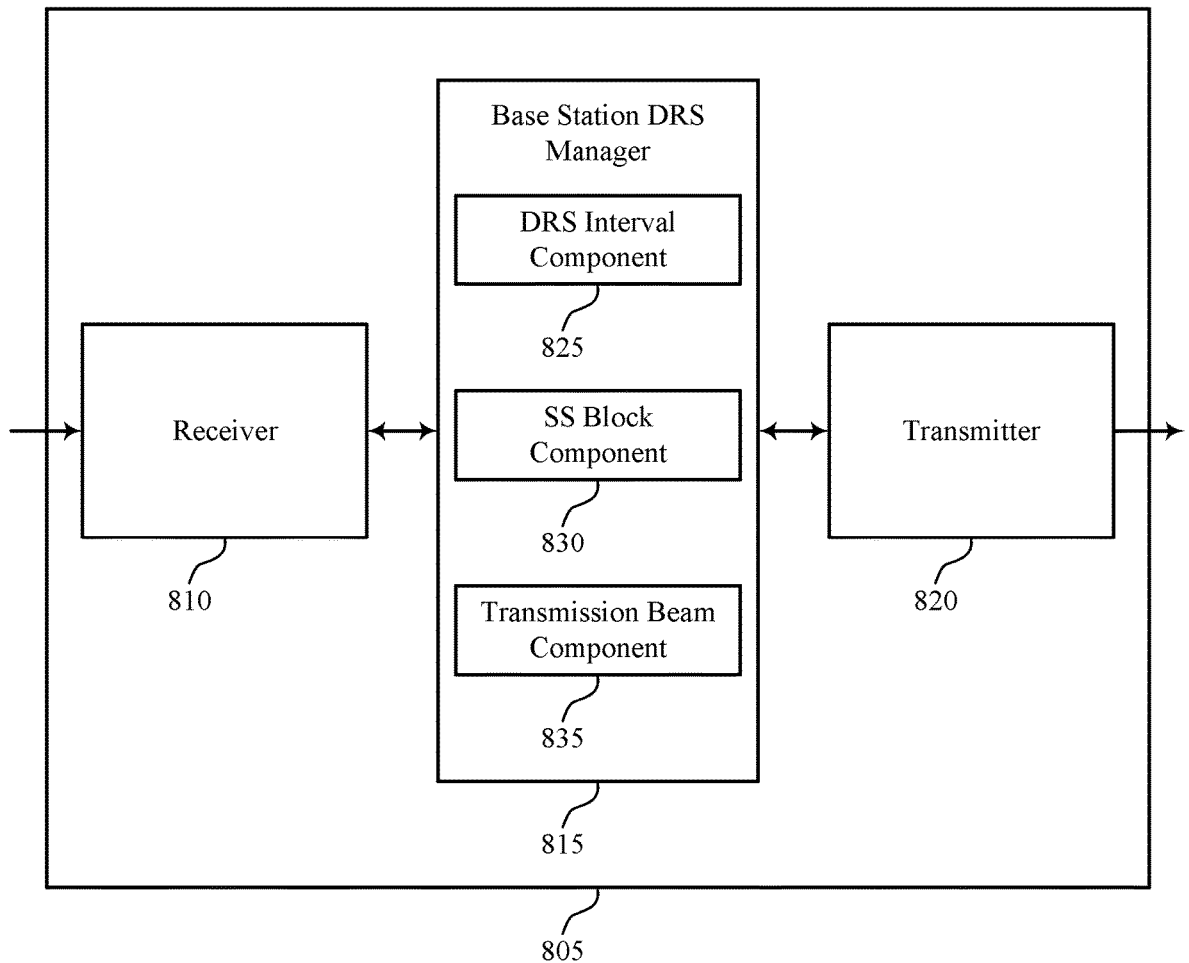

FIG. 8 shows a block diagram 800 of a wireless device 805 that supports variable length reference signaling for fast acquisition in shared spectrum in accordance with various aspects of the present disclosure. Wireless device 805 may be an example of aspects of a wireless device 705 or a base station 105 as described with reference to FIGS. 1, 2, and 7. Wireless device 805 may include receiver 810, base station DRS manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to variable length reference signaling for fast acquisition in shared spectrum). Information may be passed on to other components of the device. The receiver 810 may be an example of aspects of the transceiver 1035 described with reference to FIG. 10.

Base station DRS manager 815 may be an example of aspects of the base station DRS manager 1015 described with reference to FIG. 10. Base station DRS manager 815 may also include DRS interval component 825, SS block component 830, and transmission beam component 835.

DRS interval component 825 may determine a first DRS interval for a shared radio frequency spectrum band and determine a second DRS interval for the shared radio frequency spectrum band, where the second DRS interval is after the first DRS interval.

SS block component 830 may determine a first set of SS blocks to be transmitted in a first variable length SS burst based on a first set of transmission beams, and may determine a second set of SS blocks to be transmitted in a second variable length SS burst based on a second set of transmission beams. In some cases, SS blocks of the first set of SS blocks and the second set of SS blocks each include a PBCH message, a PSS, an SSS, or any combination thereof.

Transmission beam component 835 may transmit, using one or more transmission beams of the first set of transmission beams, the first variable length SS burst during the first DRS interval for the shared radio frequency spectrum band and transmit, using one or more transmission beams of the second set of transmissions beams, the second variable length SS burst during the second DRS interval for the shared radio frequency spectrum band. In some cases, transmission beam component 835 may transmit a third variable length SS burst in a third DRS interval based on a DRS repetition periodicity, and transmit, using one or more transmission beams of the first set of transmission beams, an opportunistic DRS during the first DRS interval. In some aspects, the third variable length SS burst is a repetition of the first variable length SS burst. In some examples, transmitting the first variable length SS burst includes transmitting using each of the first set of transmission beams.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may include a single antenna, or it may include a set of antennas.

Figure 9:
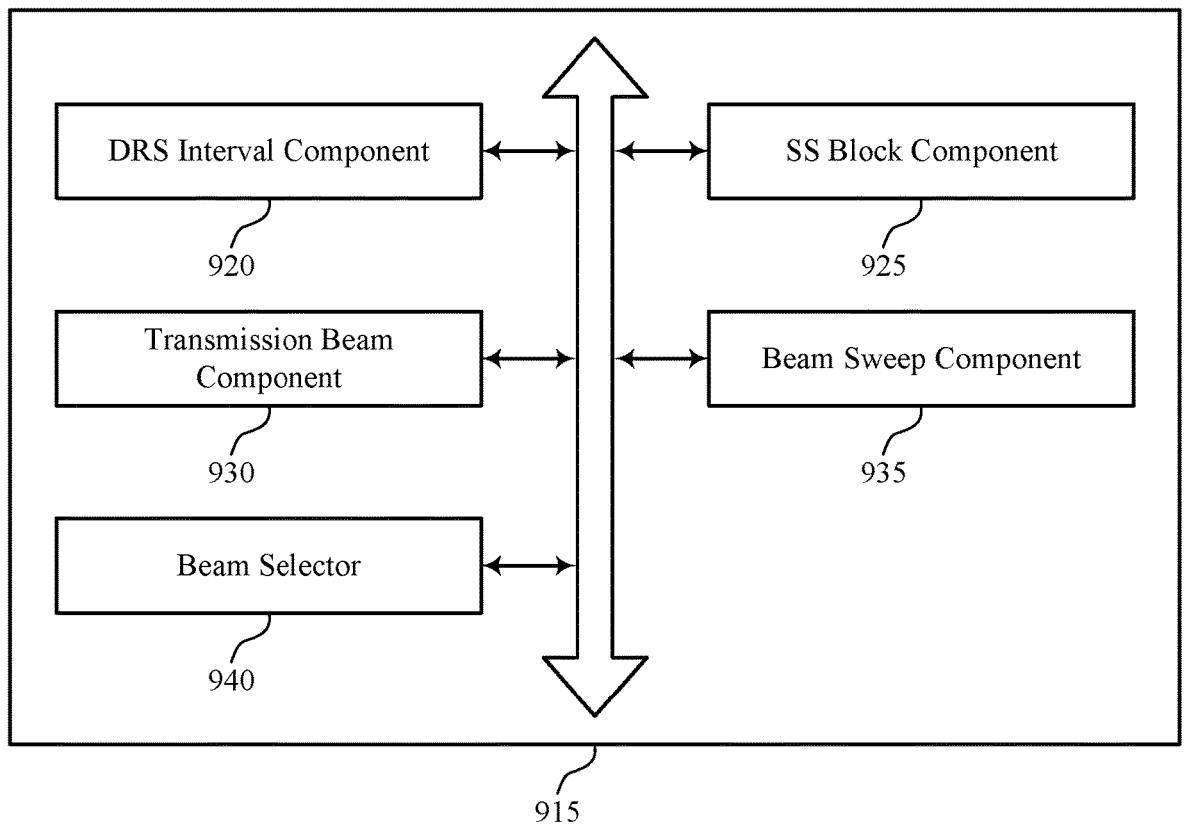

FIG. 9 shows a block diagram 900 of a base station DRS manager 915 that supports variable length reference signaling for fast acquisition in shared spectrum in accordance with various aspects of the present disclosure. The base station DRS manager 915 may be an example of aspects of a base station DRS manager 715, a base station DRS manager 815, or a base station DRS manager 1015 described with reference to FIGS. 7, 8, and 10. The base station DRS manager 915 may include DRS interval component 920, SS block component 925, transmission beam component 930, beam sweep component 935, and beam selector 940. Each of these modules may communicate, directly or indirectly, with one another (e.g., via one or more buses).

DRS interval component 920 may determine a first DRS interval for a shared radio frequency spectrum band and determine a second DRS interval for the shared radio frequency spectrum band, where the second DRS interval is after the first DRS interval.

SS block component 925 may determine a first set of SS blocks to be transmitted in a first variable length SS burst based on a first set of transmission beams, determine a second set of SS blocks to be transmitted in a second variable length SS burst based on a second set of transmission beams. In some cases, SS blocks of the first set of SS blocks and the second set of SS blocks each include a PBCH message, a PSS, an SSS, or any combination thereof.

Transmission beam component 930 may transmit, using one or more transmission beams of the first set of transmission beams, the first variable length SS burst during the first DRS interval for the shared radio frequency spectrum band. Transmission beam component 930 may transmit, using one or more transmission beams of the second set of transmissions beams, the second variable length SS burst during the second DRS interval for the shared radio frequency spectrum band. In some cases, transmission beam component 930 may transmit a third variable length SS burst in a third DRS interval based on a DRS repetition periodicity and transmit, using one or more transmission beams of the first set of transmission beams, an opportunistic DRS during the first DRS interval. In some aspects, the third variable length SS burst is a repetition of the first variable length SS burst. In some examples, transmitting the first variable length SS burst includes transmitting using each of the first set of transmission beams. In some cases, transmitting the first variable length SS burst includes transmitting the first set of SS blocks according to a beam sweep pattern.

Beam sweep component 935 may repeat the beam sweep pattern multiple times in the first variable length SS burst. In some cases, the first set of SS blocks includes multiple SS block sets and each of the multiple SS block sets spans a nominal SS period.

Beam selector 940 may select multiple beams from the first set of transmission beams based on a DRS initiation request message received from a UE 115 and perform a beam refinement procedure with the UE 115 based on the multiple beams. In some cases, performing the beam refinement procedure includes transmitting a signature on each of the multiple beams.

Figure 10:
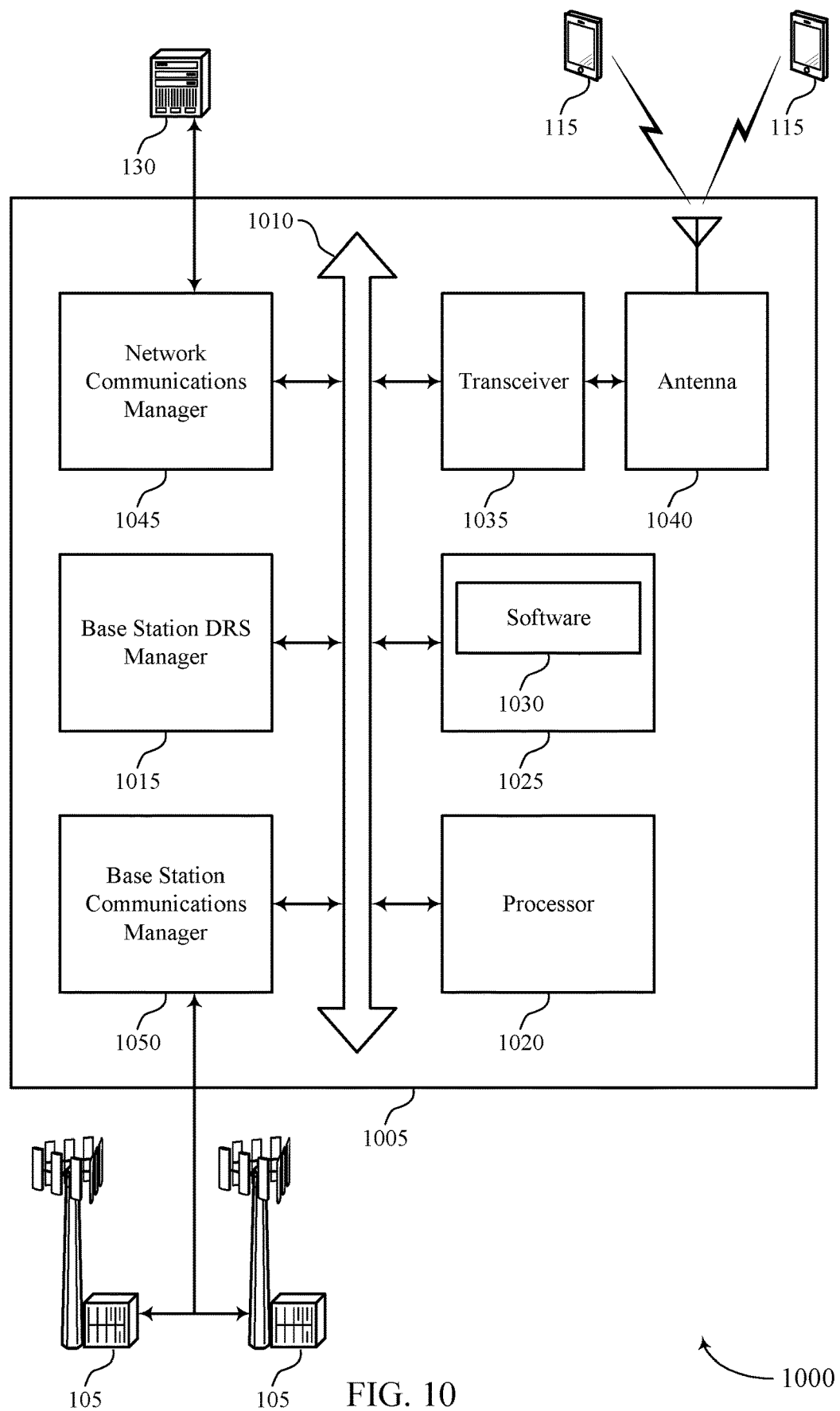
FIG. 10 illustrates a block diagram of a system including a base station that supports variable length reference signaling for fast acquisition in shared spectrum in accordance with aspects of the present disclosure.

FIG. 10 shows a diagram of a system 1000 including a device 1005 that supports variable length reference signaling for fast acquisition in shared spectrum in accordance with various aspects of the present disclosure. Device 1005 may be an example of or include the components of wireless device 705, wireless device 805, or a base station 105 as described above, e.g., with reference to FIGS. 1, 2, 7, and 8. Device 1005 may include components for bi-directional voice and data communications including components for transmitting and receiving communications, including base station DRS manager 1015, processor 1020, memory 1025, software 1030, transceiver 1035, antenna 1040, network communications manager 1045, and base station communications manager 1050. These components may be in electronic communication via one or more busses (e.g., bus 1010). Device 1005 may communicate wirelessly with one or more UEs 115.

Processor 1020 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting variable length reference signaling for fast acquisition in shared spectrum).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support variable length reference signaling for fast acquisition in shared spectrum. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas. In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Base station communications manager 1050 may manage communications with other base station 105, and may include a controller or scheduler for controlling communications with UEs 115 in cooperation with other base stations 105. For example, the base station communications manager 1050 may coordinate scheduling for transmissions to UEs 115 for various interference mitigation techniques such as beamforming or joint transmission. In some examples, base station communications manager 1050 may provide an X2 interface within an LTE/LTE-A wireless communication network technology to provide communication between base stations 105.

Figure 11:
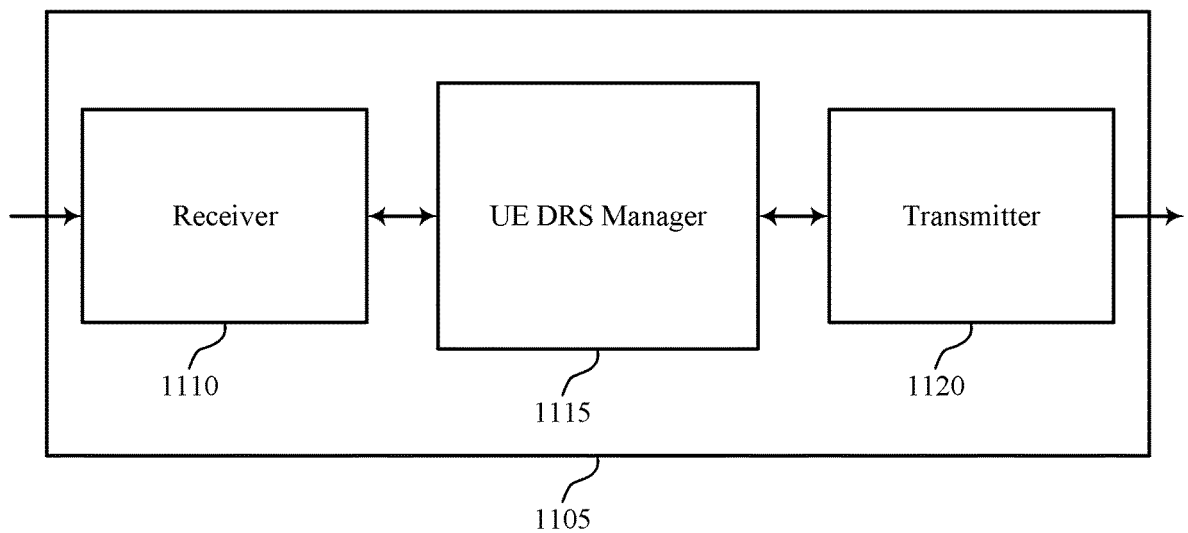
FIGS. 11 through 13 show block diagrams of a device that supports variable length reference signaling for fast acquisition in shared spectrum in accordance with aspects of the present disclosure.

FIG. 11 shows a block diagram 1100 of a wireless device 1105 that supports variable length reference signaling for fast acquisition in shared spectrum in accordance with various aspects of the present disclosure. Wireless device 1105 may be an example of aspects of a UE 115 as described with reference to FIGS. 1 and 2. Wireless device 1105 may include receiver 1110, UE DRS manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to variable length reference signaling for fast acquisition in shared spectrum). Information may be passed on to other components of the device. The receiver 1110 may be an example of aspects of the transceiver 1435 described with reference to FIG. 14.

UE DRS manager 1115 may be an example of aspects of the UE DRS manager 1415 described with reference to FIG. 14. UE DRS manager 1115 and/or at least some of its various sub-components may be implemented in hardware, software executed by a processor, firmware, or any combination thereof. If implemented in software executed by a processor, the functions of the UE DRS manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The UE DRS manager 1115 and/or at least some of its various sub-components may be physically located at various positions, including being distributed such that portions of functions are implemented at different physical locations by one or more physical devices. In some examples, UE DRS manager 1115 and/or at least some of its various sub-components may be a separate and distinct component in accordance with various aspects of the present disclosure. In other examples, UE DRS manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE DRS manager 1115 may determine a DRS interval for a shared radio frequency spectrum band and receive, using a first antenna sub-array, a first set of SS blocks of an SS burst during the DRS interval. UE DRS manager 1115 may receive, using a second antenna sub-array, a second set of SS blocks of the SS burst during the DRS interval. UE DRS manager 1115 may determine to use the first antenna sub-array or the second antenna sub-array for communication with a base station 105 based on the received first set of SS blocks and the received second set of SS blocks, and communicate with the base station 105 based on the determining.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may include a single antenna, or it may include a set of antennas.

Figure 12:
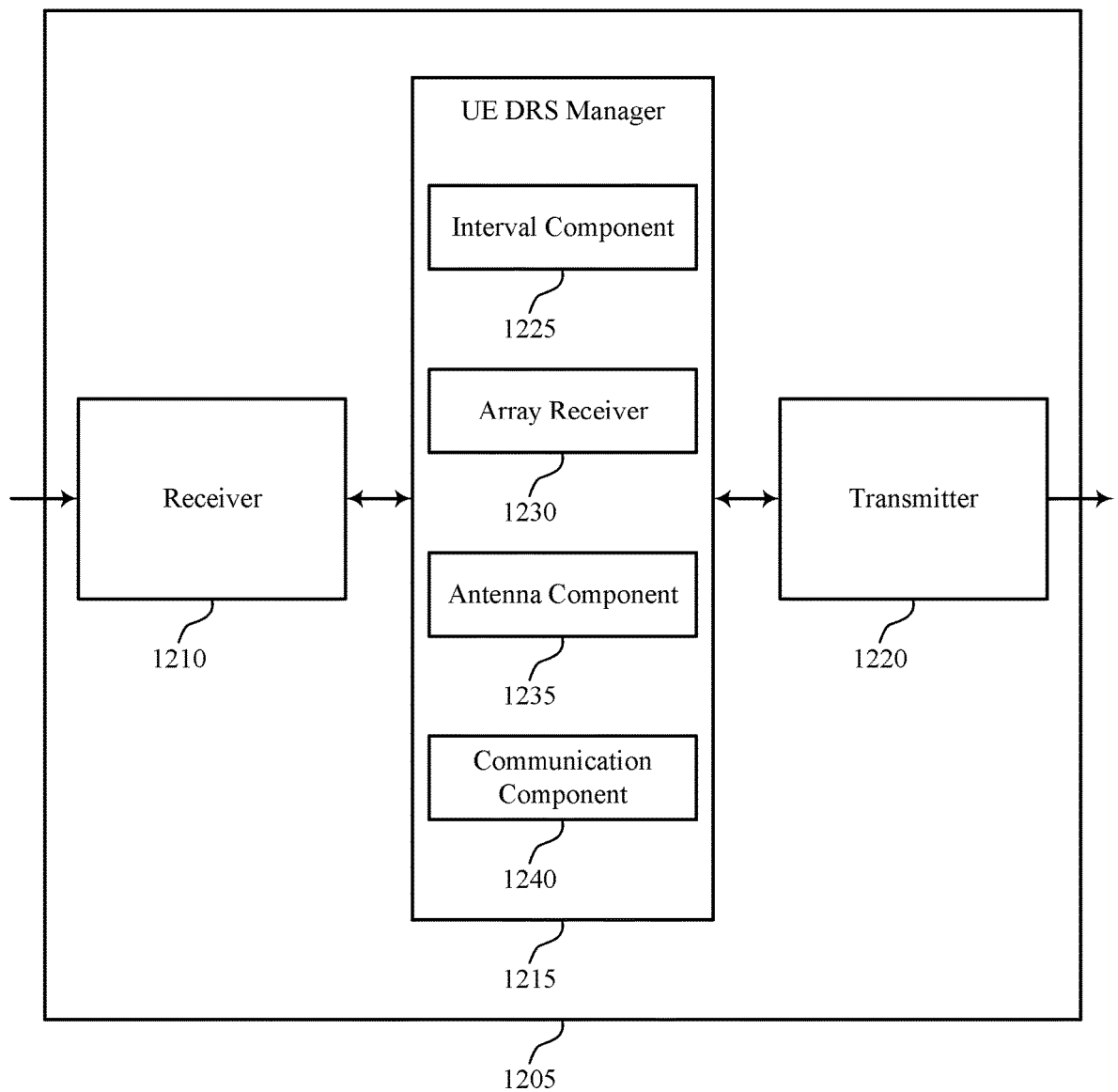

FIG. 12 shows a block diagram 1200 of a wireless device 1205 that supports variable length reference signaling for fast acquisition in shared spectrum in accordance with various aspects of the present disclosure. Wireless device 1205 may be an example of aspects of a wireless device 1105 or a UE 115 as described with reference to FIGS. 1, 2, and 11. wireless device 1205 may include receiver 1210, UE DRS manager 1215, and transmitter 1220. wireless device 1205 may also include a processor. Each of these components may be in communication with one another (e.g., via one or more buses).

Receiver 1210 may receive information such as packets, user data, or control information associated with various information channels (e.g., control channels, data channels, and information related to variable length reference signaling for fast acquisition in shared spectrum). Information may be passed on to other components of the device. The receiver 1210 may be an example of aspects of the transceiver 1435 described with reference to FIG. 14.

UE DRS manager 1215 may be an example of aspects of the UE DRS manager 1415 described with reference to FIG. 14. UE DRS manager 1215 may also include interval component 1225, array receiver 1230, antenna component 1235, and communication component 1240. Interval component 1225 may determine a DRS interval for a shared radio frequency spectrum band.

Array receiver 1230 may receive, using a first antenna sub-array, a first set of SS blocks of an SS burst during the DRS interval and receive, using a second antenna sub-array, a second set of SS blocks of the SS burst during the DRS interval. In some cases, the first set of SS blocks is received over a first time interval of a fixed length and the second set of SS blocks is received over a second time interval of the fixed length. In some examples, the first set of SS blocks includes a repetition of at least one SS block. In some instances, the first set of SS blocks and the second set of SS blocks include at least one common SS block. In some aspects, an interval between the SS burst and a second SS burst is based on DRS overcrowding, acquisition latency, beam tracking requirements, or any combination thereof.

Antenna component 1235 may determine to use the first antenna sub-array or the second antenna sub-array for communication with a base statin based on the received first set of SS blocks and the received second set of SS blocks.

Communication component 1240 may communicate with a base station 105 based on the determining.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may include a single antenna, or it may include a set of antennas.

Figure 13:
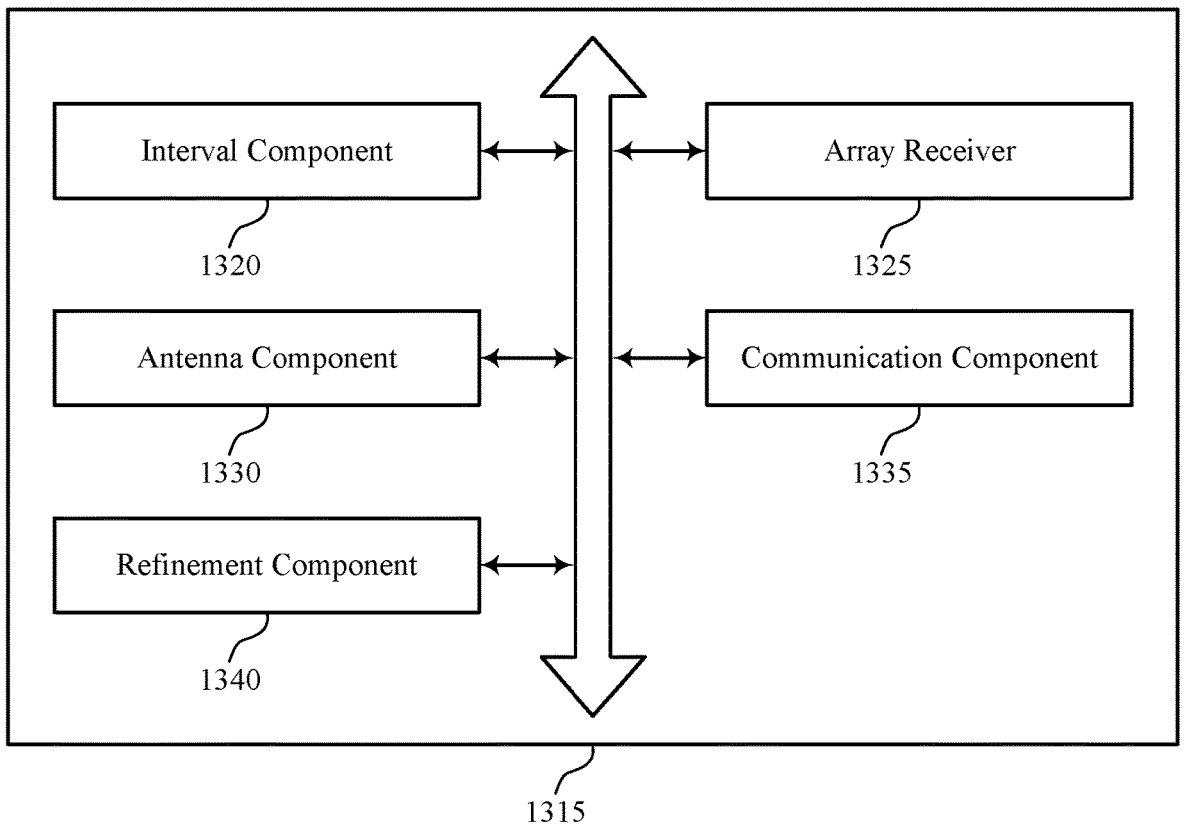

FIG. 13 shows a block diagram 1300 of a UE DRS manager 1315 that supports variable length reference signaling for fast acquisition in shared spectrum in accordance with various aspects of the present disclosure. The UE DRS manager 1315 may be an example of aspects of a UE DRS manager 1415 described with reference to FIGS. 11, 12, and 14. The UE DRS manager 1315 may include interval component 1320, array receiver 1325, antenna component 1330, communication component 1335, and refinement component 1340. Each of these modules may communicate, directly or indirectly, with one another (e.g., via one or more buses).

Interval component 1320 may determine a DRS interval for a shared radio frequency spectrum band.

Array receiver 1325 may receive, using a first antenna sub-array, a first set of SS blocks of an SS burst during the DRS interval and receive, using a second antenna sub-array, a second set of SS blocks of the SS burst during the DRS interval. In some cases, the first set of SS blocks is received over a first time interval of a fixed length and the second set of SS blocks is received over a second time interval of the fixed length. In some examples, the first set of SS blocks includes a repetition of at least one SS block. In some instances, the first set of SS blocks and the second set of SS blocks include at least one common SS block. In some aspects, an interval between the SS burst and a second SS burst is based on DRS overcrowding, acquisition latency, beam tracking requirements, or any combination thereof.

Antenna component 1330 may determine to use the first antenna sub-array or the second antenna sub-array for communication with a base station 105 based on the received first set of SS blocks and the received second set of SS blocks. Communication component 1335 may communicate with the base station 105 based on the determining. Refinement component 1340 may perform a beam refinement procedure with the base station 105 based on one or both of the received first set of SS blocks and the received second set of SS blocks.

Figure 14:
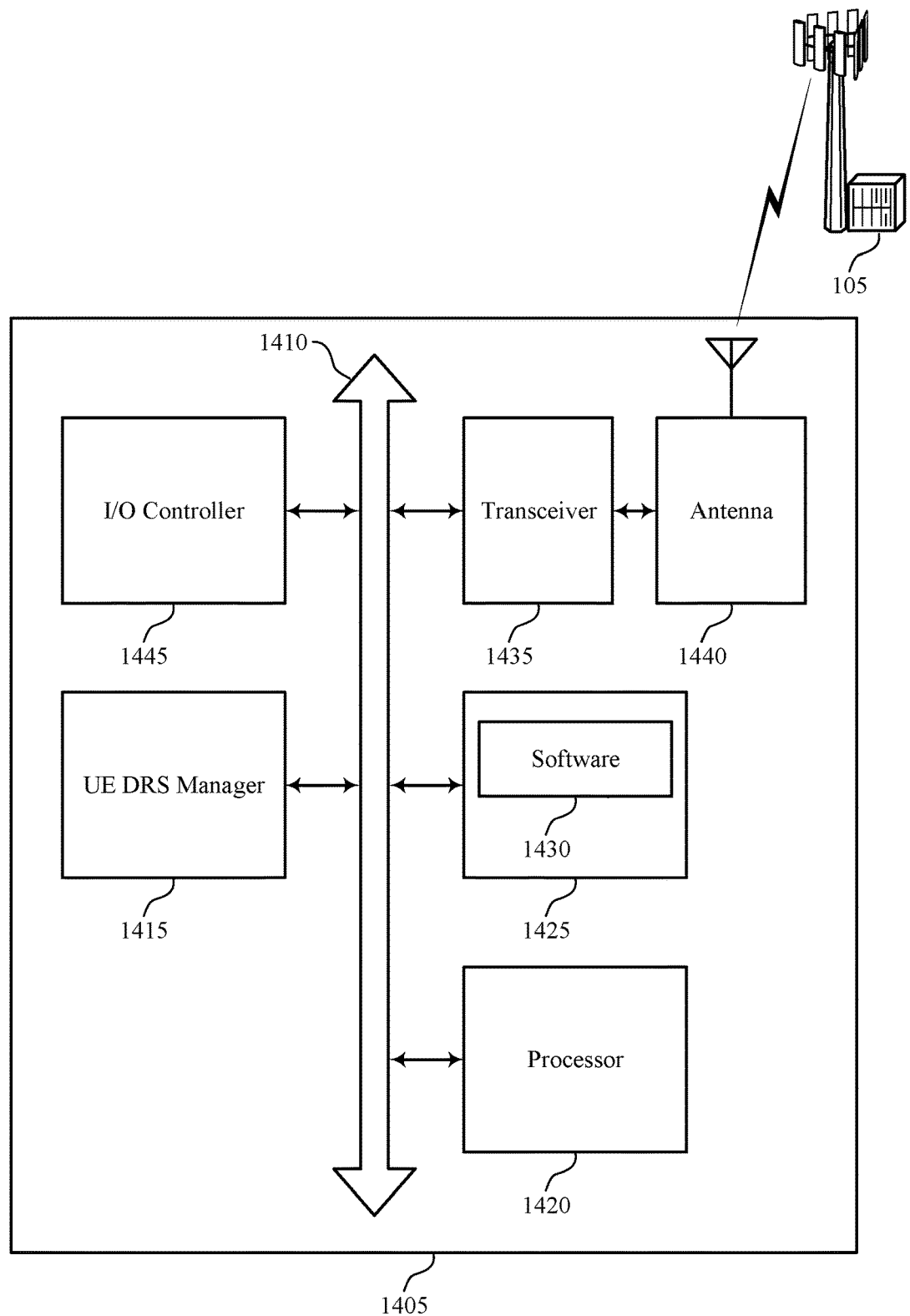
FIG. 14 illustrates a block diagram of a system including a user equipment (UE) that supports variable length reference signaling for fast acquisition in shared spectrum in accordance with aspects of the present disclosure.

FIG. 14 shows a diagram of a system 1400 including a device 1405 that supports variable length reference signaling for fast acquisition in shared spectrum in accordance with various aspects of the present disclosure. Device 1405 may be an example of or include the components of UE 115 as described above, e.g., with reference to FIGS. 1, 2, 11, and 12. Device 1405 may include components for bi-directional voice and data communications including components for transmitting and receiving communications, including UE DRS manager 1415, processor 1420, memory 1425, software 1430, transceiver 1435, antenna 1440, and I/O controller 1445. These components may be in electronic communication via one or more busses (e.g., bus 1410). Device 1405 may communicate wirelessly with one or more base stations 105.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting variable length reference signaling for fast acquisition in shared spectrum).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware and/or software operation such as the interaction with peripheral components or devices.

Software 1430 may include code to implement aspects of the present disclosure, including code to support variable length reference signaling for fast acquisition in shared spectrum. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system. In other cases, I/O controller 1445 may represent or interact with a modem, a keyboard, a mouse, a touchscreen, or a similar device. In some cases, I/O controller 1445 may be implemented as part of a processor. In some cases, a user may interact with device 1405 via I/O controller 1445 or via hardware components controlled by I/O controller 1445.

Figure 15:
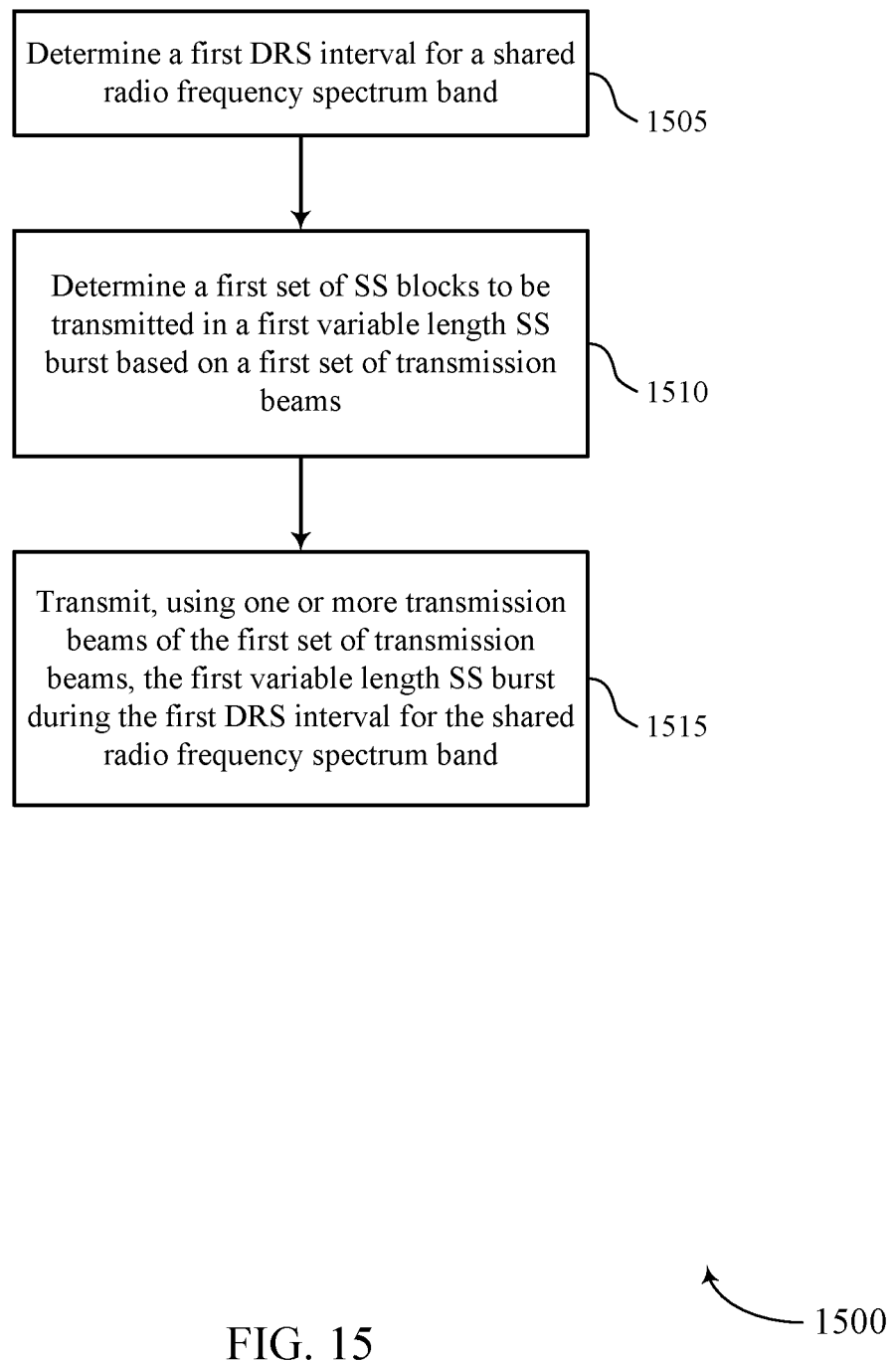
FIGS. 15 through 16 illustrate methods for variable length reference signaling for fast acquisition in shared spectrum in accordance with aspects of the present disclosure.

FIG. 15 shows a flowchart illustrating a method 1500 for variable length reference signaling for fast acquisition in shared spectrum in accordance with various aspects of the present disclosure. The operations of method 1500 may be implemented by a base station 105 or its components as described herein. For example, the operations of method 1500 may be performed by a base station DRS manager as described with reference to FIGS. 7 through 10. In some examples, a base station 105 may execute a set of codes to control the functional elements of the device to perform the functions described below. Additionally or alternatively, the base station 105 may perform aspects of the functions described below using special-purpose hardware.

At block 1505, the base station 105 may determine a first DRS interval for a shared radio frequency spectrum band. The operations of block 1505 may be performed according to the methods described with reference to FIGS. 1 through 6. In certain examples, aspects of the operations of block 1505 may be performed by a DRS interval component as described with reference to FIGS. 7 through 10.

At block 1510, the base station 105 may determine a first set of SS blocks to be transmitted in a first variable length SS burst based on a first set of transmission beams. The operations of block 1510 may be performed according to the methods described with reference to FIGS. 1 through 6. In certain examples, aspects of the operations of block 1510 may be performed by an SS block component as described with reference to FIGS. 7 through 10.

At block 1515, the base station 105 may transmit, using one or more transmission beams of the first set of transmission beams, the first variable length SS burst during the first DRS interval for the shared radio frequency spectrum band. The operations of block 1515 may be performed according to the methods described with reference to FIGS. 1 through 6. In certain examples, aspects of the operations of block 1515 may be performed by a transmission beam component as described with reference to FIGS. 7 through 10.

Figure 16:
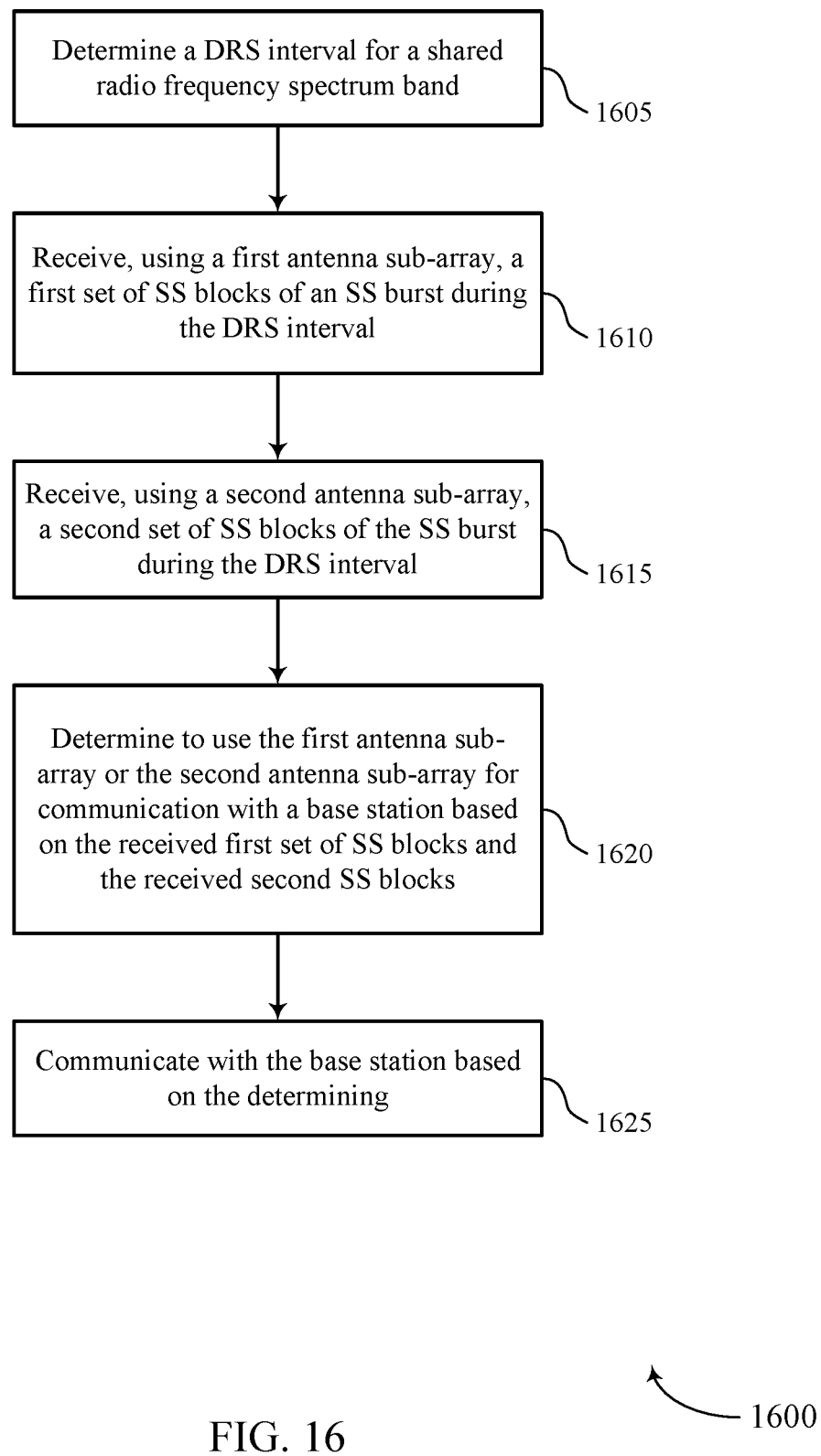

FIG. 16 shows a flowchart illustrating a method 1600 for variable length reference signaling for fast acquisition in shared spectrum in accordance with various aspects of the present disclosure. The operations of method 1600 may be implemented by a UE 115 or its components as described herein. For example, the operations of method 1600 may be performed by a UE DRS manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At block 1605, the UE 115 may determine a DRS interval for a shared radio frequency spectrum band. The operations of block 1605 may be performed according to the methods described with reference to FIGS. 1 through 6. In certain examples, aspects of the operations of block 1605 may be performed by an interval component as described with reference to FIGS. 11 through 14.

At block 1610, the UE 115 may receive, using a first antenna sub-array, a first set of SS blocks of an SS burst during the DRS interval. The operations of block 1610 may be performed according to the methods described with reference to FIGS. 1 through 6. In certain examples, aspects of the operations of block 1610 may be performed by an array receiver as described with reference to FIGS. 11 through 14.

At block 1615, the UE 115 may receive, using a second antenna sub-array, a second set of SS blocks of the SS burst during the DRS interval. The operations of block 1615 may be performed according to the methods described with reference to FIGS. 1 through 6. In certain examples, aspects of the operations of block 1615 may be performed by an array receiver as described with reference to FIGS. 11 through 14.

At block 1620, the UE 115 may determine to use the first antenna sub-array or the second antenna sub-array for communication with a base station 105 based on the received first set of SS blocks and the received second set of SS blocks. The operations of block 1620 may be performed according to the methods described with reference to FIGS. 1 through 6. In certain examples, aspects of the operations of block 1620 may be performed by an antenna component as described with reference to FIGS. 11 through 14.

At block 1625, the UE 115 may communicate with the base station 105 based on the determining. The operations of block 1625 may be performed according to the methods described with reference to FIGS. 1 through 6. In certain examples, aspects of the operations of block 1625 may be performed by a communication component as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, gNBHome NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications systems 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    determining a discovery reference signal (DRS) interval for a shared radio frequency spectrum band;
    receiving, using a first antenna sub-array, a first portion of a first synchronization signal (SS) block in a first set of SS blocks of an SS burst during a first time interval of the DRS interval and a first portion of a second SS block in the first set of SS blocks during the first time interval of the DRS interval;
    receiving, using a second antenna sub-array, a second portion of the first SS block in a second set of SS blocks of the SS burst during a second time interval of the DRS interval and a second portion of the second SS block in the second set of SS blocks during the second time interval of the DRS interval;
    determining to use the first antenna sub-array or the second antenna sub-array for communication with a base station based at least in part on the received first and second portions of the first SS block and the received first and second portions of the second SS block; and
    communicating with the base station based at least in part on the determining to use the first antenna sub-array or the second antenna sub-array for communication with the base station.

2. The method of claim 1, wherein the first set of SS blocks comprises a repetition of at least one SS block.

3. The method of claim 1, further comprising:
    performing a beam refinement procedure with the base station based at least in part on one or both of the received first and second portions of the first SS block and the received first and second portions of the second SS block.

4. The method of claim 1, wherein the first set of SS blocks and the second set of SS blocks comprise at least one common SS block.

5. The method of claim 1, wherein an interval between the SS burst and a second SS burst is based at least in part on DRS overcrowding, acquisition latency, beam tracking requirements, or any combination thereof.

6. The method of claim 1, wherein SS blocks of the first set of SS blocks and the second set of SS blocks each comprise a physical broadcast channel (PBCH), a primary synchronization signal (PSS), a secondary synchronization signal (SSS), or any combination thereof.

7. An apparatus for wireless communication, in a system comprising:
    a processor;
    memory in electronic communication with the processor; and
    instructions stored in the memory, wherein the instructions are executable by the processor to:
        determine a discovery reference signal (DRS) interval for a shared radio frequency spectrum band;
        receive, using a first antenna sub-array, a first portion of a first synchronization signal (SS) block in a first set of SS blocks of an SS burst during a first time interval of the DRS interval and a first portion of a second SS block in the first set of SS blocks during the first time interval of the DRS interval;
        receive, using a second antenna sub-array, a second portion of the first SS block in a second set of SS blocks of the SS burst during a second time interval of the DRS interval and a second portion of the second SS block in the second set of SS blocks during the second time interval of the DRS interval;
        determine to use the first antenna sub-array or the second antenna sub-array for communication with a base station based at least in part on the received first and second portions of the first SS block and the received first and second portions of the second SS block; and
        communicate with the base station based at least in part on the determining to use the first antenna sub-array or the second antenna sub-array for communication with the base station.

8. The apparatus of claim 7, wherein the first set of SS blocks comprises a repetition of at least one SS block.

9. The apparatus of claim 7, wherein the instructions are further executable by the processor to:
    perform a beam refinement procedure with the base station based at least in part on one or both of the received first and second portions of the first SS block and the received first and second portions of the second SS block.

10. The apparatus of claim 7, wherein the first set of SS blocks and the second set of SS blocks comprise at least one common SS block.

11. The apparatus of claim 7, wherein an interval between the SS burst and a second SS burst is based at least in part on DRS overcrowding, acquisition latency, beam tracking requirements, or any combination thereof.

12. The apparatus of claim 7, wherein SS blocks of the first set of SS blocks and the second set of SS blocks each comprise a physical broadcast channel (PBCH), a primary synchronization signal (PSS), a secondary synchronization signal (SSS), or any combination thereof.

13. A non-transitory computer-readable medium storing code for wireless communication, the code comprising instructions executable by a processor to:
    determine a discovery reference signal (DRS) interval for a shared radio frequency spectrum band;
    receive, using a first antenna sub-array, a first portion of a first synchronization signal (SS) block in a first set of SS blocks of an SS burst during a first time interval of the DRS interval and a first portion of a second SS block in the first set of SS blocks during the first time interval of the DRS interval;

receive, using a second antenna sub-array, a second portion of the first SS block in a second set of SS blocks of the SS burst during a second time interval of the DRS interval and a second portion of the second SS block in the second set of SS blocks during the second time interval of the DRS interval;

determine to use the first antenna sub-array or the second antenna sub-array for communication with a base station based at least in part on the received first and second portions of the first SS block and the received first and second portions of the second SS block; and communicate with the base station based at least in part on the determining to use the first antenna sub-array or the second antenna sub-array for communication with the base station.

14. The non-transitory computer-readable medium of claim 13, wherein the first set of SS blocks comprises a repetition of at least one SS block.

15. The non-transitory computer-readable medium of claim 13, wherein the instructions are further executable to:

perform a beam refinement procedure with the base station based at least in part on one or both of the received first and second portions of the first SS block and the received first and second portions of the second SS block.

16. The non-transitory computer-readable medium of claim 13, wherein the first set of SS blocks and the second set of SS blocks comprise at least one common SS block.

17. The non-transitory computer-readable medium of claim 13, wherein an interval between the SS burst and a second SS burst is based at least in part on DRS overcrowding, acquisition latency, beam tracking requirements, or any combination thereof.

* * * * *